United States Patent
Fry

(10) Patent No.: US 9,664,809 B2
(45) Date of Patent: May 30, 2017

(54) METAL OBJECT OR FEATURE DETECTION APPARATUS AND METHOD

(76) Inventor: Terry Fry, Davidsonville, MD (US)

(*) Notice: Subject to any disclaimer, the term of this patent is extended or adjusted under 35 U.S.C. 154(b) by 293 days.

(21) Appl. No.: 14/129,165

(22) PCT Filed: Jun. 25, 2012

(86) PCT No.: PCT/US2012/043987
§ 371 (c)(1),
(2), (4) Date: Apr. 1, 2014

(87) PCT Pub. No.: WO2012/178158
PCT Pub. Date: Dec. 27, 2012

(65) Prior Publication Data
US 2014/0218036 A1    Aug. 7, 2014

Related U.S. Application Data

(60) Provisional application No. 61/500,783, filed on Jun. 24, 2011.

(51) Int. Cl.
*G01V 3/08* (2006.01)
*G01V 3/10* (2006.01)
*G01V 3/165* (2006.01)

(52) U.S. Cl.
CPC .............. *G01V 3/104* (2013.01); *G01V 3/165* (2013.01)

(58) Field of Classification Search
CPC . G01V 3/38; G01V 3/081; G01V 3/08; G01V 3/15; G01V 3/104; G01V 3/165; G01R 33/072; G01R 33/414; G01R 33/3671; H04N 7/18
See application file for complete search history.

(56) References Cited

U.S. PATENT DOCUMENTS

| 3,882,374 A | 5/1975 | McDaniel |
| 4,021,725 A | 5/1977 | Kirkland |
| 4,263,553 A | 4/1981 | Cook et al. |

(Continued)

OTHER PUBLICATIONS

"Commercial Metal Detectors" by Kelly Co. Metal Detector Superstore, Apr. 27, 2011.

(Continued)

*Primary Examiner* — Minh N Tang
(74) *Attorney, Agent, or Firm* — J. Andrew McKinney, Jr.; McKinney & Associates, LLC.

(57) ABSTRACT

A metal detector system 30 for sensing target (e.g., metal) objects within soil or other strata includes a pickup head 36 carrying an excitation coil configured to generate an excitation signal to energize a target object 400 and uses a 2-D (e.g., planar, rectangular) array of pixel-receive coils configured within the pickup head to receive electro-magnetic energy from the energized target object. As the user moves the pickup head across the strata's surface, the pixel-receive coils sense relative motion between each pixel-receive coil and the energized target object, where motion is detectable as individually sensed changes in received signal levels among the pixel-receive coils. The metal detector system also includes a 2-D display 46 which depicts or visually represents the 2-D array of pixel-receive coils and generates a changing display of any sensed moving target object 60 in response to sensed changes in received signal levels among the pixel-receive coils.

6 Claims, 14 Drawing Sheets

(56) References Cited

U.S. PATENT DOCUMENTS

| | | | |
|---|---|---|---|
| 5,649,546 A | 7/1997 | Steinbeck | |
| 5,726,628 A | 3/1998 | Yoo | |
| 5,786,696 A | 7/1998 | Weaver et al. | |
| 5,969,528 A | 10/1999 | Weaver | |
| 6,421,621 B1 | 7/2002 | Earle | |
| 7,193,524 B2 | 3/2007 | Castle et al. | |
| 7,414,404 B2 * | 8/2008 | Keene | G01V 3/107 324/243 |
| 7,701,337 B2 | 4/2010 | Westersten | |
| 7,924,012 B2 | 4/2011 | Candy | |
| 7,999,550 B2 * | 8/2011 | Morrison | G01V 3/104 324/326 |
| 2011/0193558 A1 * | 8/2011 | Crowley | G01N 24/084 324/300 |

OTHER PUBLICATIONS

"Good Reasons to Own a Metal Detector" by Kelly Co. Metal Detector Superstore, Apr. 27, 2011.
"Top Six Questions to Ask Before Buying a Metal Detector" by Kelly Co. Metal Detector Superstore, Apr. 27, 2011.
"Metal Detector Comparison" by Kelly Co. Metal Detector Superstore, Apr. 27, 2011.
"Metal Detector", Wikipedia, Apr. 27, 2011.
"Inductive Sensor", Wikipedia, Apr. 27, 2011.
"Proximity Sensor", Wikipedia, Apr. 27, 2011.
"How to Make a Metal Detector", Easy Treasure UK Apr. 27, 2011.

* cited by examiner

Detector 1/3

Detector 2/3

Detector 3/3

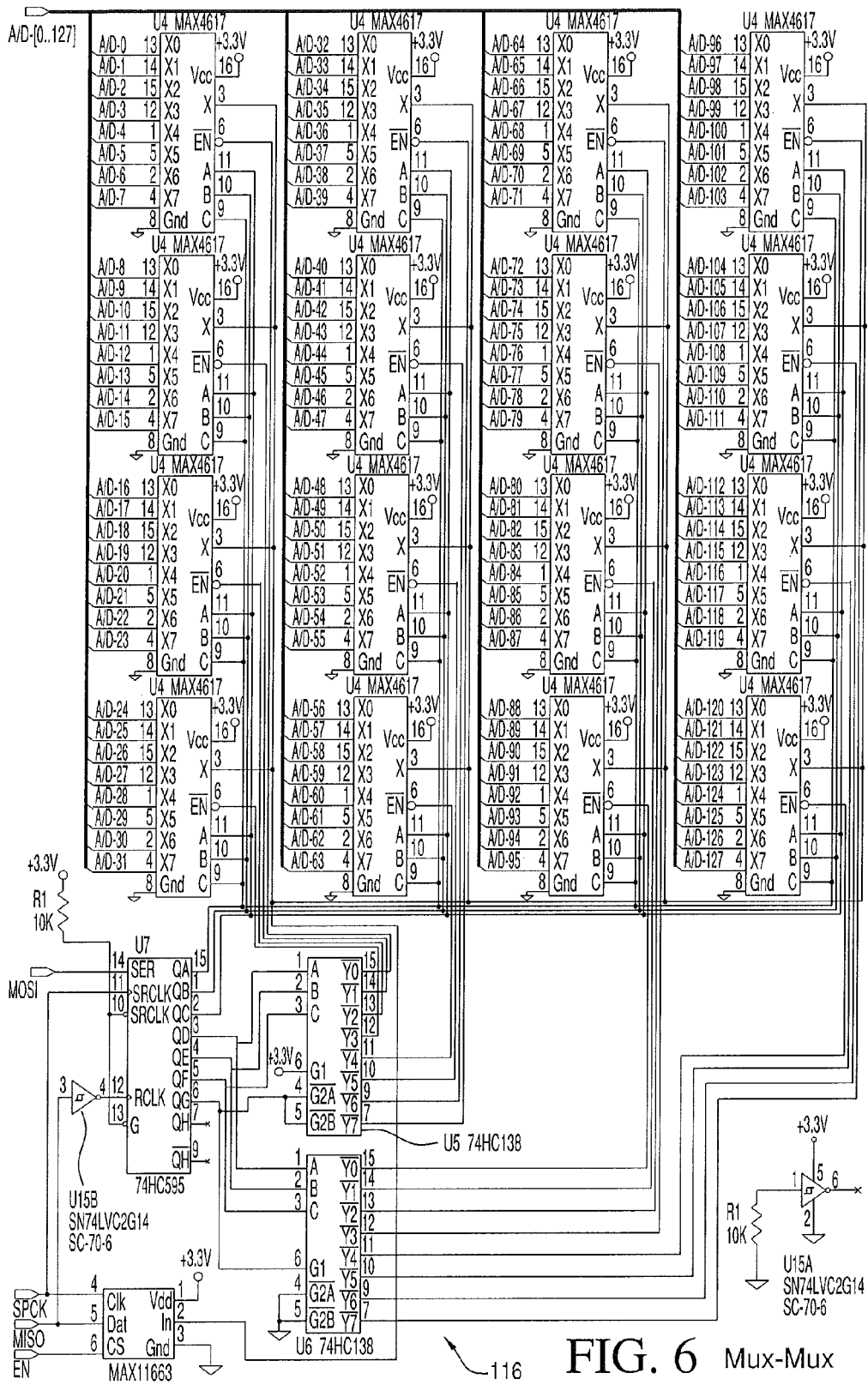
FIG. 6 Mux-Mux

METAL OBJECT OR FEATURE DETECTION APPARATUS AND METHOD

This is a Continuation application which claims priority under 35 U.S.C. 120 and 35 U.S.C.111(a) as the U.S. National Phase under 35 USC 371 of PCT/US12/043987, filed Jun. 25, 2012; published, in English, as WO/2012/178158 on Dec. 27, 2012 and also claims priority to U.S. provisional patent application 61/500,783 filed Jun. 24, 2011, the entire disclosures of which are expressly incorporated herein by reference.

BACKGROUND OF THE INVENTION

Field of the Invention

The present invention relates to metal detectors and methods for sensing and indicating the proximity of selected target objects or features concealed within or beneath surfaces such as soil or other strata.

Discussion of the Prior Art

Metal detectors have been used by civilians and military personnel for a variety of reasons. Commonly, the civilian use of metal detectors includes the enjoyment of a hobby that, in many cases, is intended to pay for itself, meaning that individuals often purchase metal detectors for assistance in finding and recovering lost articles such as coins, jewelry and other ferrous or non-ferrous metal objects.

Commercially available metal detectors have become increasingly user-friendly and a number of commercial "all-purpose" metal detectors are being sold to users hoping to recover coins jewelry or historical relics. Many engaged in the hobby of "metal detecting" frequent beach or ocean-side settings and thus use the metal detectors in damp environments, possibly including salty ocean water. Modern metal detectors often include waterproof "search coils" in a pickup array sensor mounted at the distal end of an elongated adjustable shaft. A typical metal detector may include a number of features which can be selected or adapted to a particular user's purpose, and there are different types of detectors in a variety of weights. Often, the adjustable shaft has a minimum or maximum length that permits use of the detector when the user is standing, and may be adjustable for use in some other orientation. Typically a detector includes a rechargeable system with batteries of a selected configuration.

Metal detectors usually are capable of generating an audible signal which varies depending on the proximity of the pickup array sensors to a target or object in an environment. Traditional metal detectors are usually used in conjunction with a headset or a loud speaker which provides an audible indication of the response of the pickup array sensors, and audio tones can be selected and adjusted in type, frequency and volume. Additional audible signals may include a low battery warning or other audible indicia. There is often an armrest which may include a strap and a control box to which the user attaches the headset, or headphones, for use in listening to the audible signal. Detectors often include additional controls for selecting the detector excitation signal from a number of available frequencies. Some metal detectors include interchangeable search coils which may be waterproof or submersible, while some include optional search coils which are adapted for use in selected environments or over selected surfaces.

Usually, metal detectors include a display illustrating the status of the pickup array or sensor, and may incorporate alphanumeric or graphical data indicating something about the settings of the metal detector and the response signals generated in the search coil. A number of modern metal detectors have different "search modes" and may include features designed to allow discrimination of different targets or selectable thresholds or sensitivities. Ground balancing can be fixed, manual, or automatic and target identification can be selected or programmable in one or more target ID segments. There are also metal detectors with depth indication for sensed target items or objects and some metal detectors provide spatial resolution adjustments including a "pinpoint mode". The simplest metal detectors consist of an oscillator producing an alternating current that passes thru a coil to produce an alternating magnetic field. If an object or item including some electrically conductive material, which may be referred to as the target, is close to the coil, eddy currents will be induced in the target, thereby generating an alternating magnetic field of its own. The induced alternating magnetic field is readily sensed in another coil in the detector which acts as a magnetometer and is used to measure that magnetic field. Any change in the sensed magnetic field caused by proximity to a conductive object can be detected, and such changes can be indicated by generating a corresponding audible tone or other indicia.

Metal detectors have been used to detect mines in military applications and industrial and commercial metal detectors developed in the sixties have been used extensively for mining and other industrial applications. Similar sensors are also used in the detection of weapons such as knives and guns, especially in airport security settings. Metal detectors have also been used to detect foreign objects in food and in the construction industry to detect steel reinforcing bars in concrete and pipes and wires buried within walls and floors.

One challenge for users of metal detectors is that an object may be sensed at or just below the surface of the ground, but the information about the sensed object or target item may not allow the metal detector user to determine whether the sensed item is worth recovering. In response, metal detector manufacturers have developed an induction-balance system involving two or more coils that are electrically balanced. When metal, or other electrically conductive material, is introduced into their vicinity the coils become unbalanced. The fact that every metal has a different phase response when exposed to alternating current (e.g., ferrous v. non-ferrous) allows detectors to discriminate between metals. Metal detector designers have thus attempted to develop detectors which can reliably and selectively detect desirable metals while ignoring undesirable metals. Even with discriminators, however, it is still a challenge to avoid undesirable metals because some of them, such as tin foil and gold, have similar phase responses. Discriminators may also reduce the sensitivity of the metal detector.

Coil designers have also tried out a number of configurations and orientations. Compass Electronics produced a design including 2 coils in a D shape mounted back to back to form a circle. Another development was the invention of detectors designed to cancel out the effect of mineralization in the ground, thereby giving greater detection depth, but this feature provided poor discrimination of the sensed items or targets. Many detectors in the '70s included a switch enabling the user to switch between a "discriminate" mode and a "non-discriminate" mode, thereby allowing the user to decide whether sensitivity or discrimination was a more desirable characteristic for a given environment. The induction balance detector led to the development of a motion detector in the metal detector unit which was alleged to constantly check and balance background mineralization.

A number of companies refined their metal detector designs and their work appears to be well represented in the patented prior art. For example, U.S. Pat. No. 6,421,621, assigned to Whites Electronics, describes a metal detector target identification system using "flash phase analysis" and defining what are characterized as "phase windows". This metal detector is intended to provide information about the target type.

The Minelab company recently received U.S. Pat. No. 7,924,012 on an electronic metal detector having a constant reactive transmit voltage applied to a transmit coil for transmitting an alternating magnetic field. The transmit electronics has at least two power sources, a first source connected to the transmit coil for a first period, and a second source which alternates with the first source to provide essentially constant excitation of the transmit coil and essentially continuous indicator output.

U.S. Pat. No. 5,786,696 is assigned to Garret Electronics and describes a metal detector for identifying target electrical characteristics, depth and size. The '696 patent describes digital signal processing methods used to sense predicted responses from coins, rings, pull-tabs, bottle caps, and ferrous soil so that an indication of the type of target can be provided to the user over an audio circuit and visually thru a display.

None of the metal detectors in the prior art provide a satisfactory solution to the problems frustrating metal detector users. In addition to unreliable discrimination between valuable and worthless items, all of the prior metal detectors are frustrated by "false positive" indications in wet conductive dirt or clay for users attempting to locate dangerous metal objects such as nails or valuable objects that may be on or near the surface of the soil. The applicant for the present invention has personally experienced this problem when using a very expensive commercial metal detector. Efforts to find nails in moist clay provided repeated positive indications. When the soil which was indicated to contain the detected metal object was removed from the site, that soil was again swept and a (false) indication was again observed. When the soil was broken down into smaller and smaller clumps, the applicant was frustrated to learn that there was no nail or other ferrous object and the false positive indication was simply the result of moisture in the soil.

Another problem found in the prior art is a lack of continuity in the detection signal when the detector is not moving; the audio signal indicating a target is only present when the detector is in motion, and fades away when the detector is stopped over or near a target. This makes it difficult to locate a target object with precision.

What is needed, then, is a metal object or feature detection apparatus and method which will overcome the shortcomings of the prior art.

OBJECTS AND SUMMARY OF THE INVENTION

Accordingly, it is a primary object of the present invention to overcome the above mentioned difficulties by providing a metal detector and method for sensing and indicating the location of target objects within sand, soil, or within varied strata.

Another object of the present invention is providing a target object or feature detection sensor and display system and method for sensing and indicating the location of ferrous and non-ferrous target objects or features concealed within or beneath surfaces such as soil or varied strata and which overcomes the shortcomings of the prior art.

The aforesaid objects are achieved individually and in combination, and it is not intended that the present invention be construed as requiring two or more of the objects to be combined.

Briefly, and in accordance with the present invention, a metal object or feature detection apparatus and method includes a pickup sensor array preferably mounted on the distal end of a shaft and connected to a display and a controller mounted at a near end of the shaft. The sensor array is connected to the display and the controller through an interface which includes signal generation and signal receiver circuitry for energizing the detector and for responding to received signals from the sensor array. The present application describes two embodiments of the invention, in both of which the pickup array is configured as a generally rectangular pickup housing which incorporates a plurality of small coil sensors mounted on a base plate in a spatially distributed substantially planar array. Each of these small coils is preferably configured as either an air core or iron core inductor of small size having a plurality of turns of relatively small wire, with the coils being connected to corresponding receivers in the interface circuitry.

In a first, or prototype, embodiment of the invention, each of the array sensor coils includes a ferrite core which is $\frac{1}{8}^{th}$ inch by $\frac{1}{4}$ inch by 1 inch, carrying 40 turns of 28 gauge wire. In this prototype embodiment, there were 128 array sensor coils which were divided into four quadrant groups of 32 coils each and each array sensor coil group was connected to a corresponding receiver or RX detector circuit. In second embodiment of the invention, which is a preferred embodiment, each of the sensors included 64 annular ferrite bobbins, each carrying the same number of turns of thin wire, and these sensors were divided into four quadrant groups of 16 each, also connected to corresponding receivers.

In each of the above-described embodiments, the pickup array of the present invention includes a perimeter coil which is wound around the exterior of the small coil array and is substantially coplanar with the array. This perimeter coil may be wound on the outer surfaces of side walls of the pickup housing, or may be wound around upstanding pegs mounted on the array base plate. In the described embodiments, the perimeter coil may consist of six turns of 18 AWG wire which is energizable to provide an induced magnetic field in the proximity of the sensing coils arrayed within the perimeter coil.

In the second, preferred, embodiment of the invention, four quadrant coils are provided in addition to the perimeter coil, with each quadrant coil surrounding the small sensing coils in its corresponding quadrant sector. These quadrant coils may be wound around upstanding pegs on the array base plate to be substantially coplanar with the perimeter coil. The perimeter coil, and the quadrant coils when used as energizing coils, are connectable to a suitable power source to radiate continuous AC signals at a selected frequency, and may be characterized as "illuminator" coils. Preferably, the illumination or excitation power source signal is a 5 volt, 31.25 kiloHertz sine wave, wherein the duration or period for each cycle is 20 microseconds. The sensor array coils within the quadrant coils, or the quadrant coils within the perimeter coil when used as sensor coils, are time sequence sampled by their respective receivers to detect perturbations in the generated illumination signal, and the resulting output signals are supplied through the interface circuitry to provide an image on the display that represents the received signals and identifies the location of any detected anomaly beneath the metal detector head. The sensor coils are scanned rapidly by their respective receivers so that a full update for the entire pickup array is completed ten times per second, for example, or more frequently.

The interface circuitry between the coils in the detector head and the display unit includes receivers connected to scan the outputs from the sensor coils in the four corresponding sectors in sequence by switching from one to a next selected coil every 1-3 milliseconds and dwelling until such time as the receiver has settled and sensed the coil output reliably. The receiver settling time is on the order of 1-3 milliseconds, with the switching time within the receiver between coils being independent of this settling time, on the order of nanoseconds, so there is ample time to sense the induced magnetic field in each of the array coils before the receiver switches to another coil within the assigned coil subset for that receiver.

In a modified form of the first embodiment of the invention, instead of having a perimeter illumination coil, a number of the array coils can be driven with the excitation signal, in which case other coils in the array are then used to sense the induced magnetic field to provide outputs at their corresponding receivers, either during the illumination or during intervals when the illumination coils are not driven. In still another form of the invention, selected pixel coils may be driven with the excitation signal for a selected interval and then toggled to a connection with a corresponding receiver for sensing target object energy. Any one or more of the pixel coils may be driven with the excitation signal for a selected interval and then toggled to a connection with a receiver for use in combination with the remaining coils in the sector for sensing target object energy.

In both embodiments of the present invention, the metal detector is provided with a compact solid state display unit such as a commercially available GPS receiver having a touch screen display, and a plurality of user-adjustable controls. In the first embodiment, the display screen shows a dot or other avatar that moves on the screen as the detector head moves to display the relative location of a target object with respect to the head. In the second embodiment, the display screen provides a color image having blocks representative of each small sensor coil and sectors representing each of the quadrant coils, with the color of each varying with the intensity of the magnetic field detected by the sensor corresponding to that block or sector. The colors of the blocks and of the sector in the displayed image change as the detector head moves with respect to a target, indicating which sensor coil in the array is receiving the strongest signal and thus providing an accurate display of the target location.

In accordance with the method of the present invention, a user first normalizes or calibrates the metal detector in one of two ways. First, it can be done by holding the pickup array sensor vertically so that nothing but air is present around the pickup array. The excitation or illumination signal is then energized and the receivers sense their corresponding array coils individually so that a calibrated response in air can be generated and displayed. Alternatively, the metal detector can be calibrated by placing the pickup sensor on or near the ground and energizing the illumination signal to normalize the displayed response to any background conductivity in the soil where detecting is to be carried out. The metal detector of the present invention will generate a uniform and two dimensional image on the display screen in response to normalization. This will be featureless when normalization is carried out while the metal detector is held up in the air, but will have a background color when normalization is carried out with the detector on or near the ground. In either case, the normalized response is used as a baseline for comparing the array coil responses during metal detection activities. The user controls include a "normalize" button or control input for use in this normalization or calibration procedure.

The user will also preferably have access to one or more linear or continuously adjustable controls for illumination power, illumination signal, intensity and frequency and receiver sensitivity and frequency response. The receive signal can be adjusted for a "squelch" like feature which permits the user to control the sensed response of the metal detector.

After adjustment and normalization of the detector, the user sweeps or moves the pickup array over the soil as the perimeter coil, and the quadrant coils in the second embodiment, are illuminated. The target location information is sensed as phase changes in the induced magnetic field that is received in each of the sensor coils, and these phase changes are observable on the display screen as the user sweeps the pickup array past a concealed target so that, in terms of relative motion, the target image traverses the display screen while the user sweeps the pickup array over ground.

In the absence of target items or objects, the display screen of the present invention will generate an easily distinguishable 2-D image for a sensed response from uniform and homogenous soil. In the second embodiment described above, the screen will provide a background color representing the conductivity of the soil. As the user sweeps the pickup array over the soil the display will show that the movement is sensed but will not provide any visible indicia tending to indicate that a sensed ferrous or non-ferrous target object or item is within the homogenous soil.

Moving the detector head over a ferrous or non-ferrous target item or object within the soil will generate a different image for the display. For the first embodiment, this may be in the form of an illuminated dot, as shown in one of the drawings accompanying this application, which moves as the pickup array is moved over the otherwise homogenous soil. In the preferred form of the second described embodiment, the display will provide a color image representing the intensity of the detected signal for each of the sensing coils. The ferrous or non-ferrous nature of the target will be represented by the color of the block, and as the user moves the pickup array over the soil concealing the target item the colors of the blocks and segments will change. By observing the appearance of the display, the user can discover the location of the target item under the soil beneath the moving pickup array.

During use of the detector of the second, preferred form of the invention, the detector array may be operated in three modes; a deep mode, a shallow mode, or a cycling mode wherein the unit continuously cycles between the deep and shallow modes. In the deep mode, the perimeter coil described above is energized to illuminate the ground beneath the detector head, and the quadrant coils are connected to, and scanned by, receivers in the interface circuitry with the resulting output signals being supplied to the display unit to produce a color display in each of the four quadrants of the display screen that corresponds to the intensity and phase of the received magnetic field. The presence of a target (or targets) in the magnetic field below the detector head will perturb the illuminating field, and this will be detected in varying degrees by the four quadrant coils to produce corresponding changes in the color of the display in corresponding sectors of the screen. In this mode, the detector is sensitive to large targets and to targets relatively far below the surface of the ground. As the detector head moves across the ground, the color changes to track the relative position of the target with respect to the detector head.

In the shallow mode of operation, the perimeter coil is disconnected from the power supply, and the quadrant coils are connected to it to serve as illuminator coils; preferably the coils are energized sequentially, one at a time or in diagonal pairs. At the same time, the small sensor coils are scanned by the interface receivers, and their outputs are supplied to the display screen. The screen includes multiple display blocks, each corresponding to one of the sensor coils in the array, and each having a color corresponding to the intensity of the magnetic field perturbation detected by its sensor coil to produce a color pattern that indicates the presence of a target and its proximity to each coil. Again, as the detector head is moved across the ground, the color of each block changes to track the relative position of the target with respect to the detector head.

In the cycling mode, the detector is operated to alternate continuously between the deep and shallow modes, with the display screen showing a color pattern that represents the deep mode in its quadrants and represents the shallow mode in its blocks. This changing color effect gives the user a changing pattern representing a three-dimensional view of the ground beneath the detector head as the detector is moved, and this is normally the preferred mode of operation of the device.

Because the present device utilizes an alternating illumination field, with phase detection of perturbations in the field caused by anomalies in the field, the device operates to identify and locate targets with respect to the detector head even when the head is stationary over a target. With the color display providing both a deep and a shallow mode view of the target, the device provides the user with an enhanced view of the target image and, with the color of the display indicating the intensity of the received signal, it provides an improved indication of the target's location and depth.

In accordance with the present invention, the metal object or feature detection system including the coil arrays described above can also be used to detect cracks in substantially planar aluminum structures such as the exterior shells of airliners and other aircraft. Cracks in an aircraft fuselage can be detected by moving the pickup array sensor past the surface of the fuselage and watching the sensed response on the display. This provides an indication that would be similar to a real-time magnaflux test where the image changes in the presence of the crack or rivet in a way that simulates the accumulation of magnaflux powder in the crack or metal defect.

In summary, then, in accordance with the method of the present invention, the detector unit is first calibrated, or normalized with the air or with the ground that is to be searched, but at a location where no target metal is located. Then the control unit is activated to produce illuminating magnetic fields while the receivers scan the sensor coils in a rapid time sequence to detect perturbations in the field caused by target metal objects. While standing or walking, the user sweeps the hand-held metal detector head with its array of illuminating and sensor coils over the ground laterally in a section of an arc left to right and then back to left while viewing the substantially rectangular 2-dimensional display on the display screen. In the preferred or second embodiment of the invention, the outer perimeter coil is first energized while the four quadrant coils are monitored to detect output signals representing targets that are relatively deep below the surface of the ground being scanned. Thereafter, the quadrant coils are energized either sequentially or in diagonal pairs and their corresponding sensor coil arrays are monitored to detect output signals representing relatively shallow targets.

The energization of the perimeter and quadrant coils can be controllably alternated but preferably is automatically cycled in a time sequence on the order of 10s of milliseconds. This cycling of deep and shallow detection results in a corresponding color display having quadrants corresponding to the quadrant coils and smaller squares or segments within the quadrants corresponding to the individual sensor coils, with colors varying in intensity with the strength of the detected perturbations. This effectively provides a three-dimensional color display that enables the user to determine the location and the depth of a target item.

The display thus paints a virtual representation of a detected object, which may be referred to as a target avatar, as the user sweeps the pick-up left and right. During the sweeping process, if a detected object or target is sensed by one of the small coils near an edge of the pick-up head, the display shows a corresponding target avatar at the edge of the display screen, and as the pick-up moves laterally over the detected target object, the avatar will move across the display. The color of the avatar will represent its proximity to the sensor coil, which is a function of its depth, so that the user gets a sense, during use, of the relative depth, position and motion of the detected object beneath the pickup coil by virtue of the visible motion of the target avatar across the two dimensional display. The target avatar will have a selected shape such as, for example, a circular yellow "Pac Man" style dot in the first embodiment of the invention, or a n array of squares, each representing the output of a corresponding coil in the preferred embodiment, while the color and intensity provide an indication of the relative position and sensed characteristics of the target object.

In still other embodiments of the invention, the pick-up's individual pixel coils can be directly energized or excited for a selected period and then can be switched to use as sensor coils. For example, a selected subset of pixel coils within the array may be excited to illuminate the left half of the array and the right half can be used to sense while the pickup is moved in an arc from left to right during the sweeping motion. Further, a target object may present a strongest and first sensed response in a pixel coil closest to the target object at that instant, while other pixel coils may be subject to spurious received energy due to reflections or the like. In order to prevent confusing displays, the signals received from the pixel coils may be selectively enabled or disabled in a space-gate selection process where the metal detector only displays information from the pixel or receive coil which is likely to be closest to a detected target object, thus allowing "tracking".

In another embodiment, the user might wear stereo headphones with left and right ear speakers, with the audio tones generated for perception by the user being modulated in such a way that proximity of the target object is indicated by a change in intensity or loudness of the playback tone in the left or right ear speakers. In addition, a tonal change or frequency shift in the tone can be used to indicate whether the object is ferrous or non-ferrous. For example, a low frequency tone can be used to indicate detection of a ferrous object while a high frequency tone can be used to indicate detection of a nonferrous object. Directional information is also being provided to the user in this embodiment. With left and right earphones, the user can experience stereo or binaural playback so that as the pickup is swept left to right and a target object is detected, the detection tone can initially appear only in the left headphone and as the pickup is swept past the target object the apparent location of the tone can be centered between the left and right speakers, transitioning over to the right speaker as the object passes beneath the right side pixel coils, whereupon, ultimately, the tone is played back only in the right ear. In this way the user can elect either to look at the display to see the passing target avatar or can listen to the playback tone to track the relative position of the target object beneath the pickup array. Alternatively, the user can rely on both visual and audible indications of relative positions of the target object while engaging in the left to right then right to left sweeping motion while walking with the metal detector.

BRIEF DESCRIPTION OF THE DRAWINGS

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components, and wherein:

FIG. 6 is a schematic diagram of a multiplexer circuit for the circuitry of FIG. 4, in accordance with the present invention.

DESCRIPTION OF PREFERRED EMBODIMENTS

Figure 1:
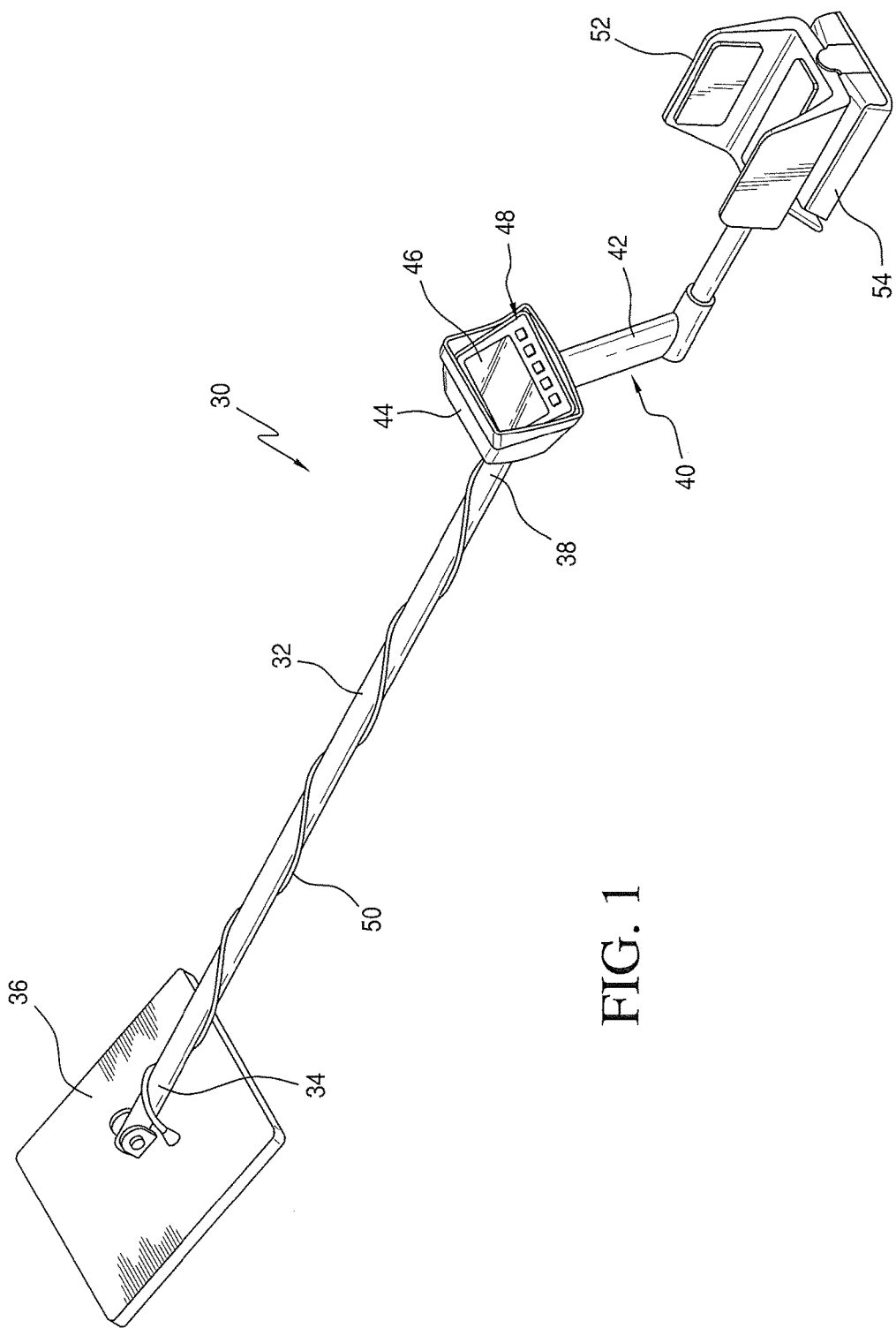
FIG. 1 is a top perspective view of a metal detector incorporating the features of the present invention and illustrating, with the following drawings, a detector and method for sensing and indicating location and proximity of user-selected target objects or features within sand, soil, or within varied strata, in accordance with the present invention.

Turning now to a more detailed description of a first embodiment of the present invention, with reference to FIGS. 1-6, there is illustrated in FIG. 1 a hand-held metal object or target detection apparatus 30 having a stem section, or shaft 32 supporting at a distal end 34 a pickup head 36 carrying a sensor array to be described, and having at a proximal or near end 38 a handle 40 having a hand grip 42. Mounted on the proximal hand grip and connected the sensor array is a controller and interface module 44 which incorporates electronic detection circuitry having signal generation and signal receiver circuits, further described below, together with a display screen 46 and an operator touch pad 48.

The pick-up or search head 36 includes transmit and receive coils that are connected via a cable 50 to the electronics package housing 38. Although illustrated as being wrapped around the stem 32, it will be understood that the cable can extend through the stem. As illustrated in FIG. 1, the detector 30 optionally includes a conventional arm rest 52 and battery pack 54.

Figure 2:
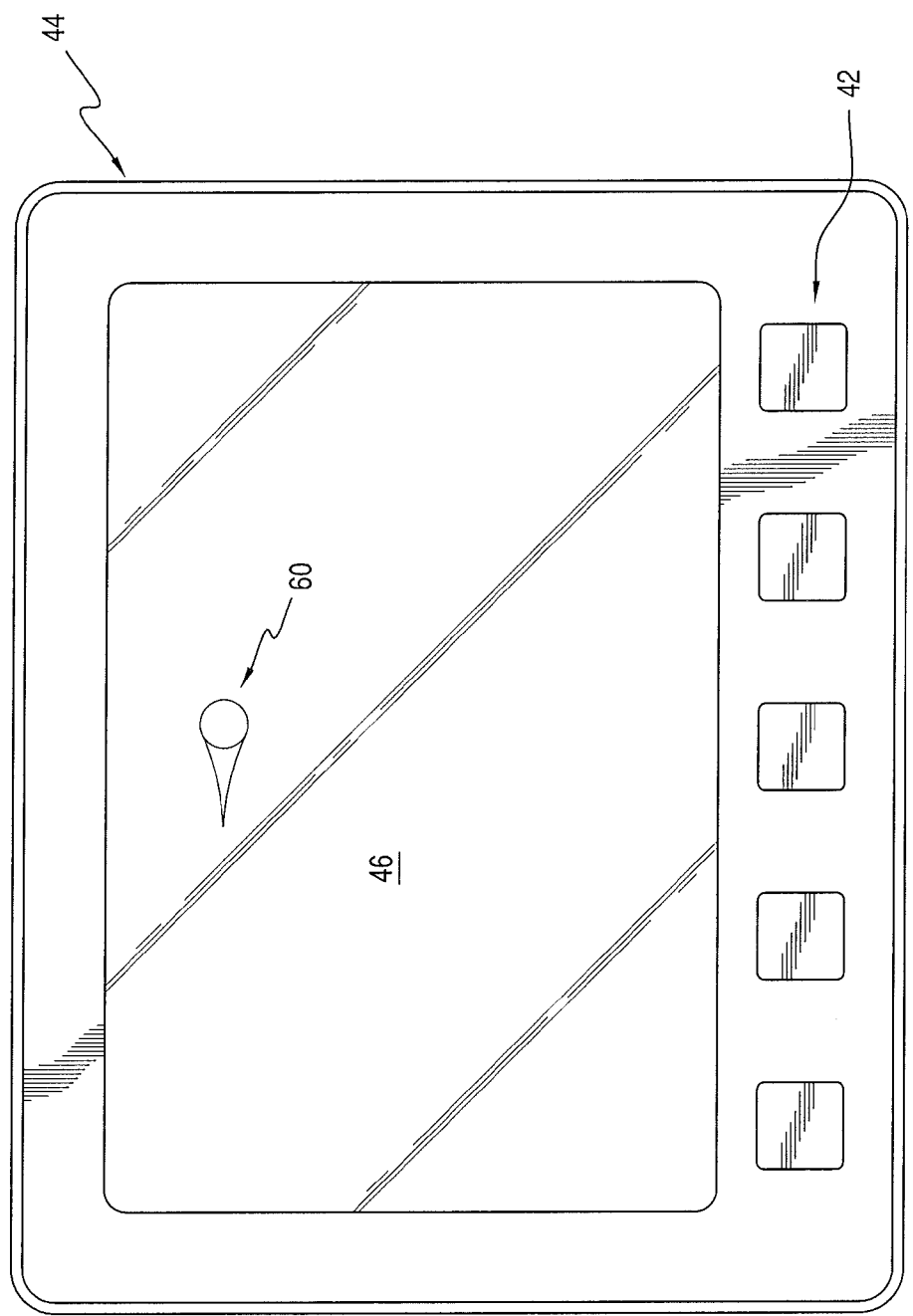
FIG. 2 is a diagrammatic and enlarged illustration of a display screen for a first embodiment the device of FIG. 1, in accordance with the present invention.

FIG. 2 diagrammatically illustrates an enlarged plan view of the display screen 46 and control input touch pad 44 on the controller 44, which comprise an integral unit. The display screen 46 responds to signals from the sensor in the pickup head and to the circuitry in the controller 44 to provide a graphic display for indicating the 2-dimensional indication of the relative position, depth, and size of a target object which has been detected by the metal detector 30. Preferably, an illuminated target avatar or dot 60 is provided by the circuitry, and moves (e.g., left to right, as seen in FIG. 2) as the pickup array is moved over a surface where a target is located. The target item represented by the dot 60 moves on the display just as the user moves the pickup array in head 36 over the surface concealing the target item. By observing the appearance of the moving dot on the display, the user can discover the location of the target item beneath the moving pickup array. The touch pad 48 shown in FIG. 2 provides operator control for the metal detector 30. This includes a power on/off switch and a menu of selectable items for controlling the operation of the detector.

In accordance with the method of present invention, when a user holds and swings the metal detector 30 and a target has been detected, the sensors will produce on the display 46 the visible indicator 60 so that the user or operator is provided with an indication of the moving position of the detected target as well as its approximate size. The distal pick-up head 36, shown in FIG. 1, is illustrated in further detail in FIGS. 3 and 3A, which are bottom plan and side elevation views of the head 36, respectively. As illustrated, the head consists of a generally rectangular housing 70 having a depending inset shoulder 71 wall inset from the side wall 72 of the housing, and having a generally planar bottom cover 73 within shoulder 71. The bottom cover is shown as being partially cut away, as at 74, to reveal the interior of the housing. Mounted on a base plate 75, which is secured within the housing, are a multiplicity of small sensor, or receive coils 76, which may be referred to as "pixels", and which are arranged in a substantially planar rectangular array of, for example, regular rows 78 and columns 80. Each of these small pixel coils is preferably configured either as an air core or iron core inductor of small size having a plurality of turns of relatively thin wire. In the first, or prototype embodiment of the invention, each of the array sensor receive coils 76 included a ferrite core which was $1/8^{th}$ inch by $1/4$ inch by 1 inch, carrying 40 turns of 28 gauge wire. In this prototype embodiment, there were 128 sensor coils which were divided into 4 groups or quadrants RX1, RX2, RX3 and RX4, respectively, (shown in dotted lines in FIG. 3) of 32 pixel coils each, and each sensor coil in a group or quadrant was connected to a corresponding receiver, or detector circuit, to be described.

Figure 3:
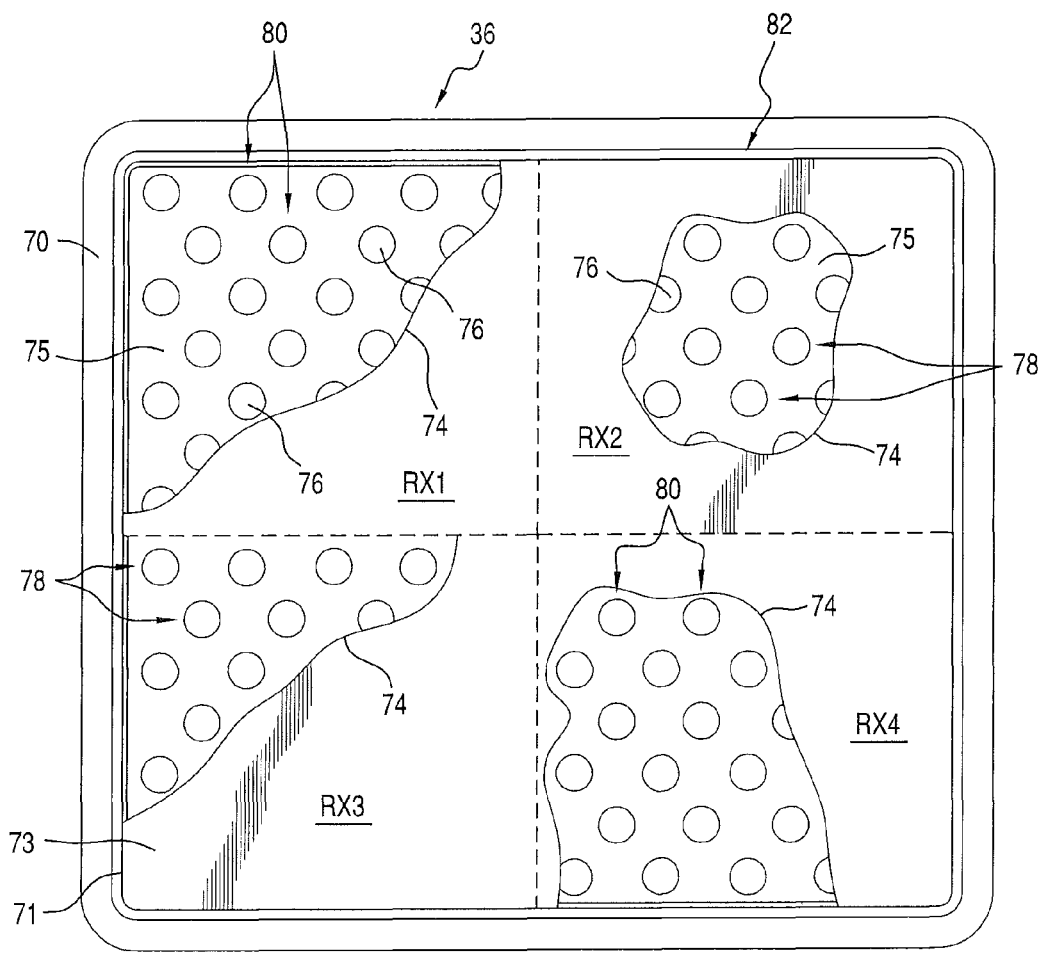
FIG. 3 is a bottom plan view of the detector head for the first embodiment of the device of FIG. 1, partially cut away to illustrate a sensor array having four quadrants, or sectors, in accordance with the present invention.
Figure 3A:
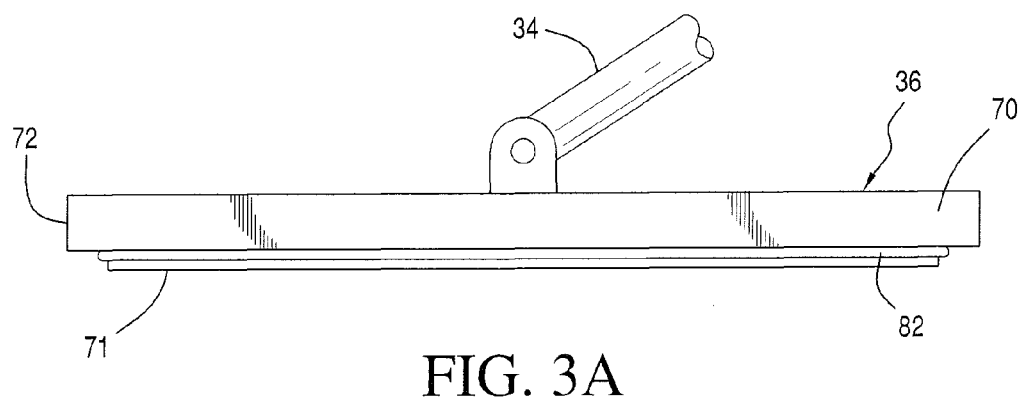
FIG. 3A is a side elevation of the detector head of FIG. 3, in accordance with the present invention.

The pick-up or search head 36, in the first embodiment, also incorporates a transmit, or illuminator perimeter coil 82 which is wound around the perimeter of the array of sensor coils 76, for example on the outside of a shoulder wall 71, as illustrated in FIGS. 3 and 3A, and is connected to the power supply 54 by way of cable 50. In another form of this embodiment, a selected number of the pixel coils 76 may be connected to the power supply to serve as illuminator coils in lieu of coil 82, as will be described. The coil configuration that is illustrated in FIGS. 3 and 3A incorporates an array of pixel or receive coils (e.g., coils 76) which are spaced from each other in a selected two dimensional (2-D) array, such as the rows and columns 78 and 80, covering substantially all of the pick-up head 36. In this embodiment, the transmit coil 82 is either coplanar with the receive coils or offset somewhat.

Figure 4:
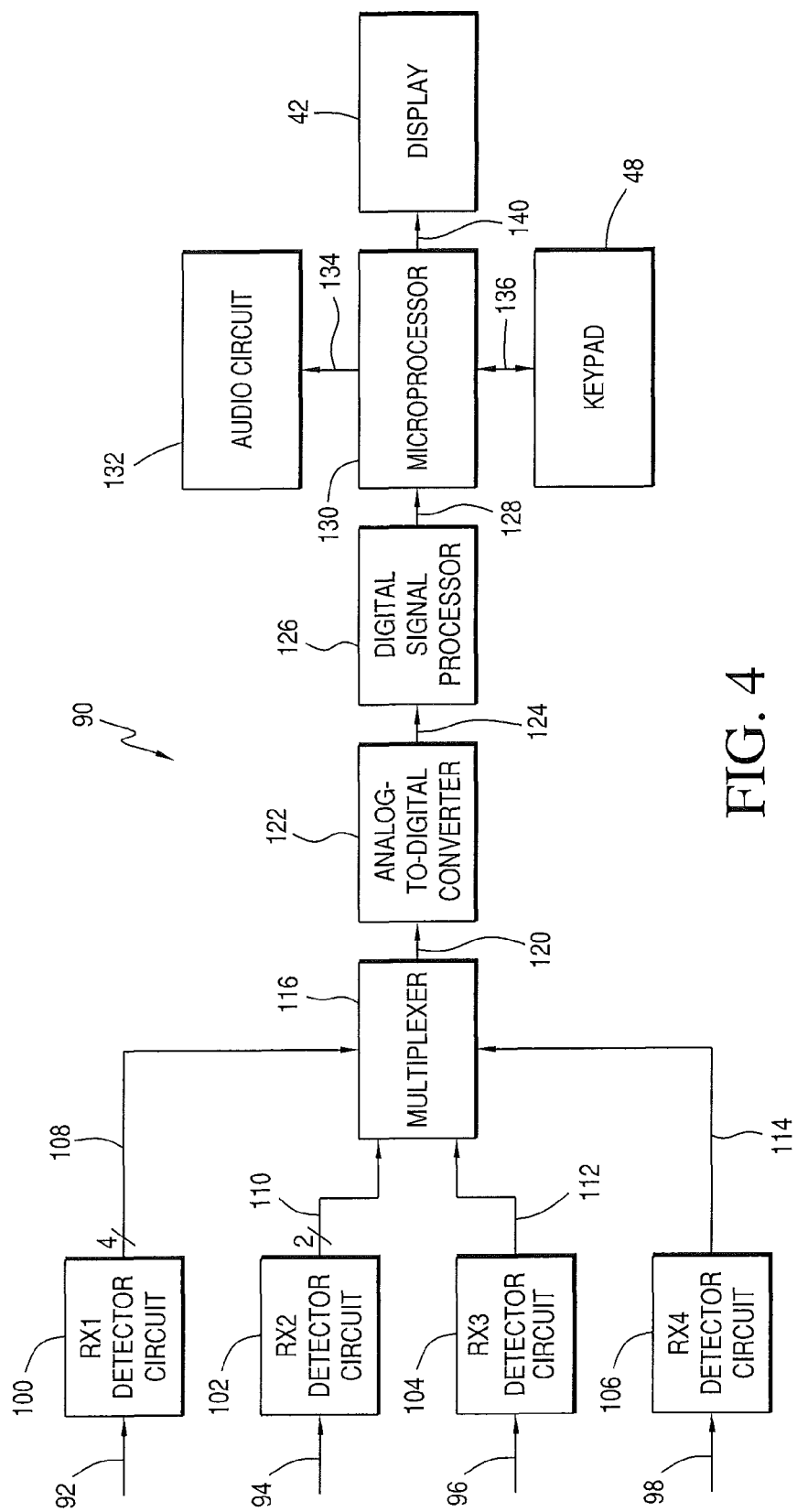
FIG. 4 is a block diagram of electronic circuitry for the first embodiment of the metal detector of FIG. 1, in accordance with the present invention.

The array of receive or sensor coils is connected to corresponding components of electronic circuitry 90 for the metal detector 30, as illustrated in FIG. 4. The pixel or receive coils in each quadrant RX1-RX4 are connected via cables 92, 94, 96 and 98 to corresponding RX1-RX4 receivers, or detector circuits 100, 102, 104 and 106, each of which is illustrated in detail in the detector circuit 110 shown in the detailed schematic diagrams of FIGS. 5A-5C. The four detector circuits 100, 102, 104 and 106 generate signals which are transmitted through multi-conductor lines or cables 108, 110, 112, and 114 to a multiplexer circuit 116, shown in the schematic diagram of FIG. 6.

The multiplexer 116 cycles through detector output signals from the detector circuits 100, 102, 104 and 106 and provides the output signal from each pixel sequentially through a line 120 to an analog-to-digital converter 122. The resulting digital signal output is sent via a digital bus 124 to a digital signal processor 126, which is connected through a bidirectional bus 128 to a microprocessor 130. The operation of the digital signal processor 126 is described below. The operation of the microprocessor 130 drives an audio circuit 132 via line 134 for producing selected audio responses when targets are detected or other conditions occur in the metal detector 30. In addition, the microprocessor 130 is also connected via a bidirectional bus 136 to the control input keypad 48 for providing operator input into the metal detector 30, and via line 140 to the two-dimensional (2-D) array display 46, which is illustrated in FIG. 2.

As noted above, the distal pickup head preferably includes a perimeter illuminator coil 82 which is wound around the array of receive coils 76 adjacent the exterior side surfaces of the pick-up housing, (shown from below in FIG. 3). In the prototype first embodiment described above, and illustrated in FIG. 7, six (6) turns of 18 AWG wire are used to form coil 82 which, when energized by the power supply 54, provides a magnetic field in the proximity of the sensor coils 76 which are arrayed within the perimeter of coil 82 when the detector head 36 is assembled. The illumination or excitation signal from the power supply in this embodiment is a 50 kilohertz sine wave which produces 20 microsecond cycles so that the perimeter coil produces an alternating magnetic field at 50 kilohertz. The receiver coils 76 in the four sensor/pixel coil sectors are each scanned rapidly by their respective receivers, or detector circuits 100, 102, 104 and 106 so that a full array update for the entire pickup array is completed ten times per second, or more frequently if desired. The 128 sensor coils in the array are time sequence sampled by their respective receivers by the multiplexer 116.

In an alternative form of this embodiment, instead of having the perimeter illumination coil 82, a plurality of the pixel array coils 76 can be driven with the excitation signal, and other pixel coils in the array are then used to sense the induced magnetic fields by selectively connected receivers during the interval when coils are not driven.

In the method of the present invention, the user operates the metal detector 30 by using the controller 44, which includes a compact, solid state color display 46, by way of the plurality of user adjustable controls 48. The user normalizes or calibrates the metal detector 30 by holding the distal pickup array sensor head 36 vertically so that nothing but air is present around the pickup receiver coil array. The excitation or illumination signal provided by the power supply is then energized and each of the sector receivers, or detector circuits 100, 102, 104 and 106 senses its corresponding array coils individually so that a calibrated response in air can be generated for use as a baseline or normalized figure when comparing the array coil responses during metal detection activities. The user controls 48 include a "normalize" button or control input for use in this normalization or calibration procedure, and preferably incorporates one or more linear or continuously adjustable controls for illumination power, illumination signal intensity and frequency, and receiver sensitivity and frequency response. The receive signal can be adjusted by a conventional "squelch" like feature which permits the user to control the metal detector's sensed response.

The visible display on screen 46 in the present embodiment is useful for detecting a ferrous or non-ferrous target object such as a nail in wet soil when the user sweeps or moves the pickup head 36 and its array of coils 76 over the soil while studying the display avatar 60. In use, the metal detector of the present invention generates a uniform and featureless two-dimensional image in response to normalization while the metal detector pickup is held up in the air, but generates an easily distinguishable, changing 2-D image (see FIG. 2) for a sensed response from uniform and homogenous wet soil having no target items or objects. As the user sweeps the pickup head 36 over the soil, display 46 will show that the movement is sensed but will not provide any visible indicia in the absence of a sensed ferrous or non-ferrous target object or item within homogenous wet soil.

When a ferrous target item or object such as a nail is within the wet soil, a third or different image is generated for display 46. This image, which is the illuminated target avatar or dot 60, moves across the screen 46 (e.g., left to right, as seen in FIG. 2) as the pickup head coil array is moved over the otherwise homogenous soil. The target item represented by the dot 60 moves on the display just as the user moves the pickup array 36 over the soil that conceals the target item. By observing the appearance of the moving dot 60 on display screen 46, the user can discover the location of the target item under the soil and beneath the moving pickup head 36. Thus, the user distinguishes the item in the wet dirt as the user sees the dot 60 "go by" while sweeping pickup array 36 past the sensed target object or item.

In accordance with the present invention, each of the RX1-RX4 detector circuits is connected to a selected subset (e.g. 32) of a selected total number (e.g. 128) of the arrayed small sensor coils 76. The target object location information is sensed as phase changes received in each of the array's pixel coils and these sensed phase changes are observable as the user sweeps the pickup array in head 36 past a concealed target object so that, in terms of relative motion, the object traverses the array while the user sweeps the pickup head over the ground. Alternatively, amplitude changes could be sensed with phase changes as each pixel coil passes a target object or feature.

The prototype of the first embodiment of the present invention used a color GPS-style display using a standard display interface, and indicated changes in the signals received from the pickup array sensor pixel receive coils often enough to provide then-current information at a relatively rapid rate of 32 frames per second on display screen 46.

Figure 5A:
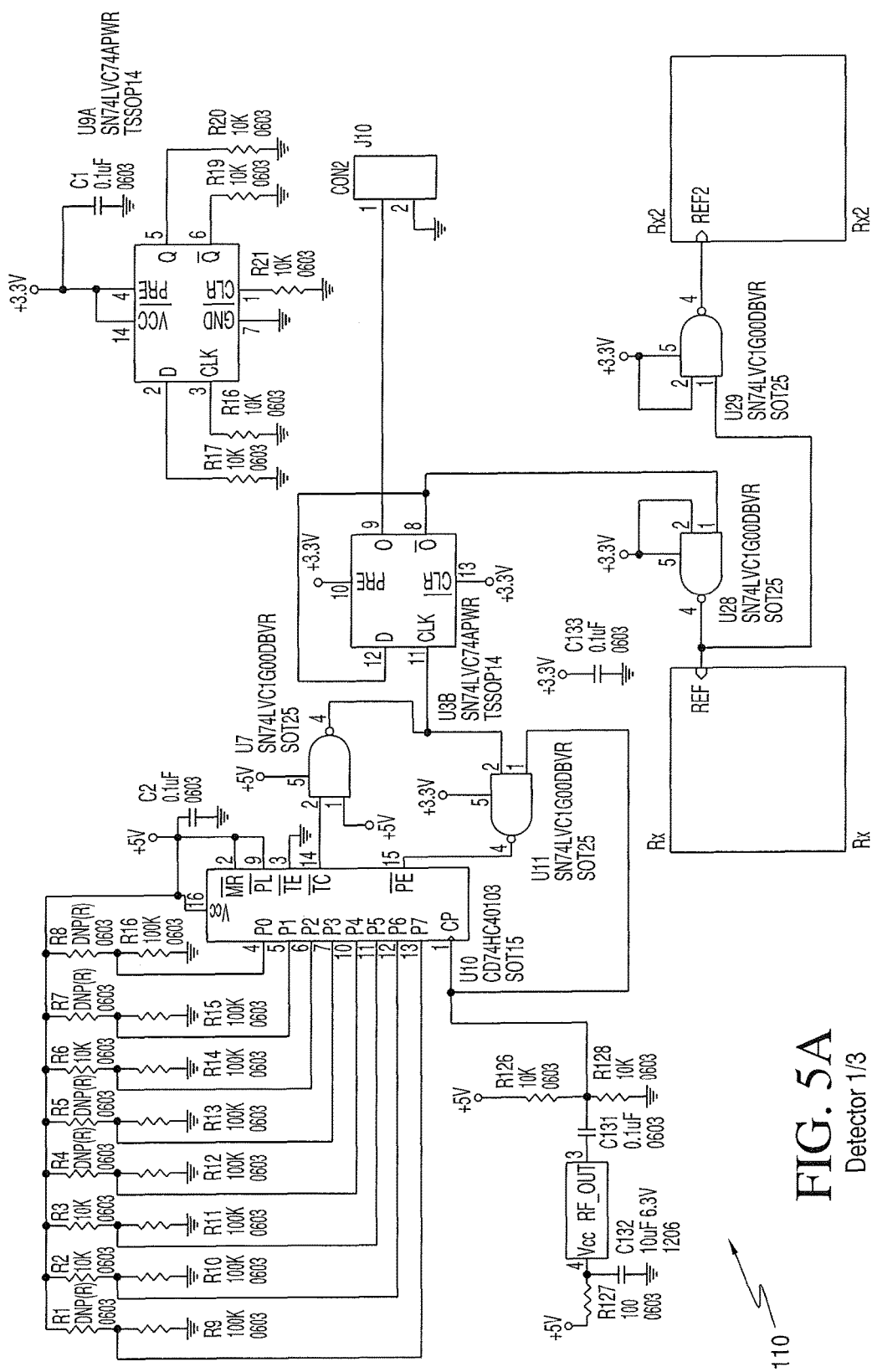
FIGS. 5A-5C are schematic diagrams of suitable receivers, or detector circuits, used in the circuitry of FIG. 4, in accordance with the present invention.
Figure 5B:
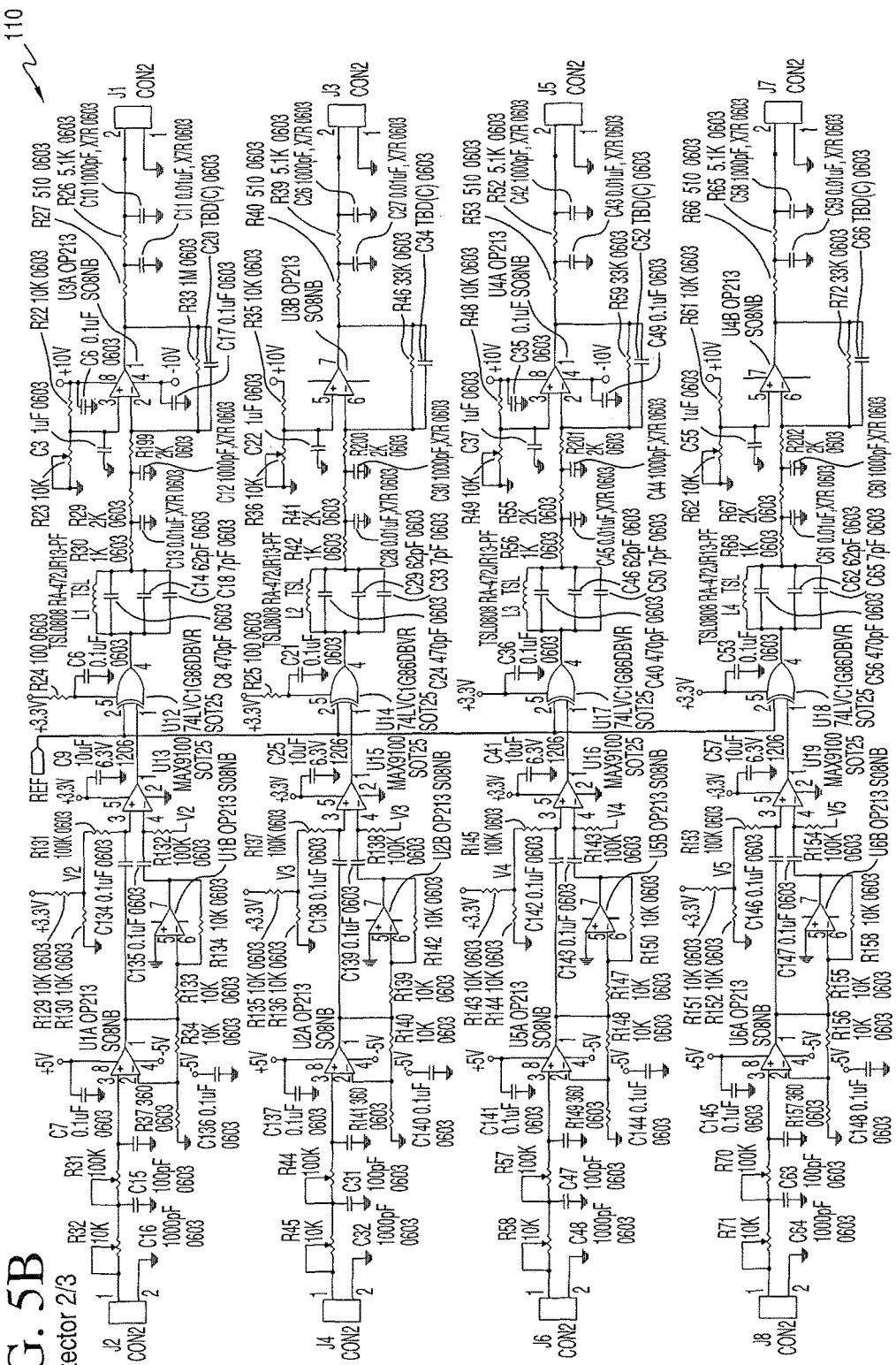
Figure 5C:
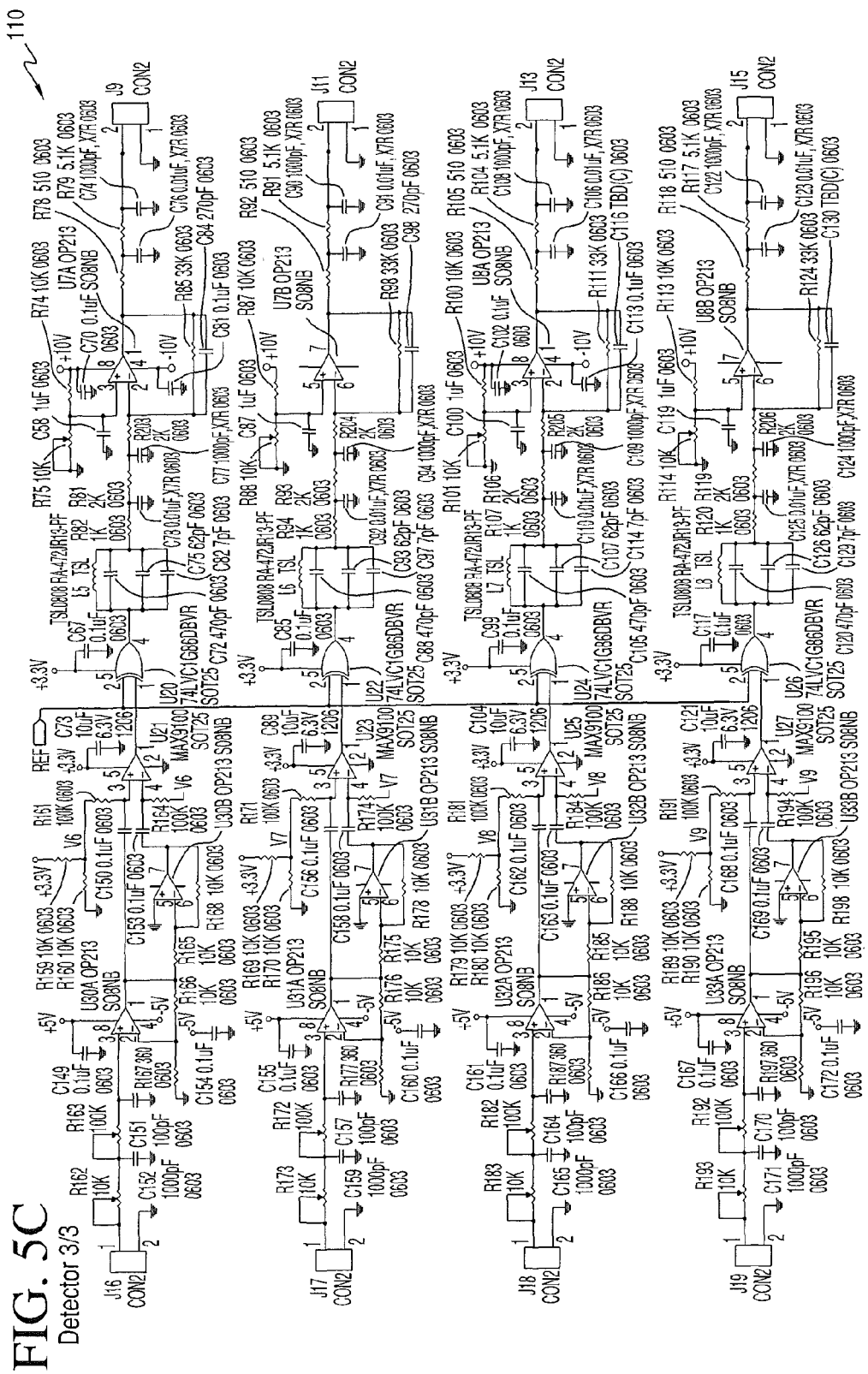

In the receiver or detector circuit shown in the schematics of FIGS. 5A-5C, four receivers are provided, one for each of the pixel array sectors. Each detector circuit is used to sense each one of its corresponding 32 pixel coils in sequence by switching to the selected coil every 1-3 milliseconds and dwelling until such time as the receiver has settled and reliably sensed the pixel coil output. The receiver settling time is also on the order of 1-3 milliseconds, and the switching time within the receiver between coils, which is independent of this settling time, is on the order of nanoseconds, so there is ample time to sense the induced magnetic field in each of the array coils before the receiver switches to another coil within the assigned coil subset, or sector, for that receiver.

The metal object or feature detection system 30 including the coil array described above can also be used to detect cracks in substantially planar aluminum structures such as the exterior shells of air liners and other air craft. Cracks in an air craft fuselage can be detected by moving the pickup array sensor past the surface of the fuselage and watching the sensed response on the display. This provides an indication that would be similar to a real-time magnaflux test where the image changes in the presence of the crack or rivet in a way that simulates the accumulation of magnaflux powder in the crack or metal defect.

In accordance with the preferred method of the present invention, the user sweeps the metal detector pick-up or search head 36 over the ground laterally in a section of an arc left to right and then back to left while viewing the substantially rectangular 2-dimensional display 46 which can either be attached to the metal detector, as illustrated in FIG. 1, or connected by a flexible umbilical cable and held in a stationary position for viewing. Display 46 generates or paints the real-time virtual representation, or target avatar 60, of a detected object on the screen as the user sweeps the pick-up head left and right and the target is sensed by one of the pixels or small coils 76. As the pick-up head moves over the detected target object, the target avatar 60 moves across the two dimensional display screen 46 so that the user gets a sense, during use, of the relative position and motion of the detected object beneath the pickup head. Target avatar 60 may have a shape such as, for example, a circular yellow "Pac Man" style dot, but the color, shape, persistence, intensity, and the shape and length of the "tail" while the pick-up is moving can all be selected to provide an indication of the relative position and sensed characteristics of the target object.

As described above, the small coils or pixel coils 76 can be used solely for receiving magnetic field energy generated by a surrounding field generating coil 82 to sense perturbations in the field indicative of a target or object, or can be used, in an alternative form of this embodiment, without the coil 82, to cause selected small sensor coils or pixel coils to be connected periodically to the energizing source to produce illuminating or exciting magnetic fields under pick-up head 36, In this latter case, other coils 78 in the pick-up array are used in that instant to sense the effect of a target object on the field so produced, thereby providing the required data for display screen 46. Illumination of a target object by a perimeter coil or illumination of a target object from selected pixel coils can be selected for different embodiments or different metal detection applications.

In another form of this first embodiment, selected individual pixel coils can be directly excited for a selected period to produce an illuminating magnetic field, and then can be switched to use as sensor coils. For example, a selected subset within the array of pixel coils 76 such as the coils in segments RX1 and RX3 can be excited to illuminate the left side of the array from the power supply, and the coils in the segments RX2 and RX 4 in the right half of the array (as viewed in FIG. 3) can be used to sense perturbations in the generated alternating magnetic field while the pickup head 36 is moved in an arc from left to right during the sweeping motion.

A target object may present a strongest and first sensed response in a pixel coil that is located just above the target object at that instant, while other pixel coils might respond to received energy due to spurious reflections or the like. In order to prevent confusing displays, the signals received from the pixel coils may be selectively enabled or disabled in a space-gate selection process where the metal detector only displays information from the receive coil which is most likely to be closest to the target and thus most likely to be tracking a detected target object.

The user of the illustrated device might wear stereo headphones with left and right ear speakers, wherein audio tones generated by received signals for perception by the user can be modulated such that proximity of the target object is indicated by a change in intensity or loudness of the playback tone. In addition, a tonal change or frequency shift in the tone can be used to indicate whether the object is ferrous or non-ferrous. For example, a low frequency tone can be used to indicate detection of a ferrous object while a high frequency tone can be used to indicate detection of a nonferrous object. Directional information is also provided to the user in this embodiment. With left and right earphones the user can experience stereo or binaural playback so that as pick-up head 36 is swept left to right and a target object is detected, the detection tone can initially appear only in the left headphone as the left side of the pick-up 36 is swept past the target object. The apparent location of the tone the transitions through an apparent central location between the left and right speakers to the right speaker as the object passes beneath the central and then the right side pixel coils, whereupon, ultimately, the tone is played back only in the right ear. In this way, the user can elect either to look at the display 42 to see the passing target avatar 60 or can listen to the playback tone to track the relative position of the target object beneath the pickup head 36. Alternatively, the user can rely on both visual and audible indications of relative positions of the target object while engaging in the left to right then right to left sweeping motion while walking with the metal detector 30.

Figure 7:
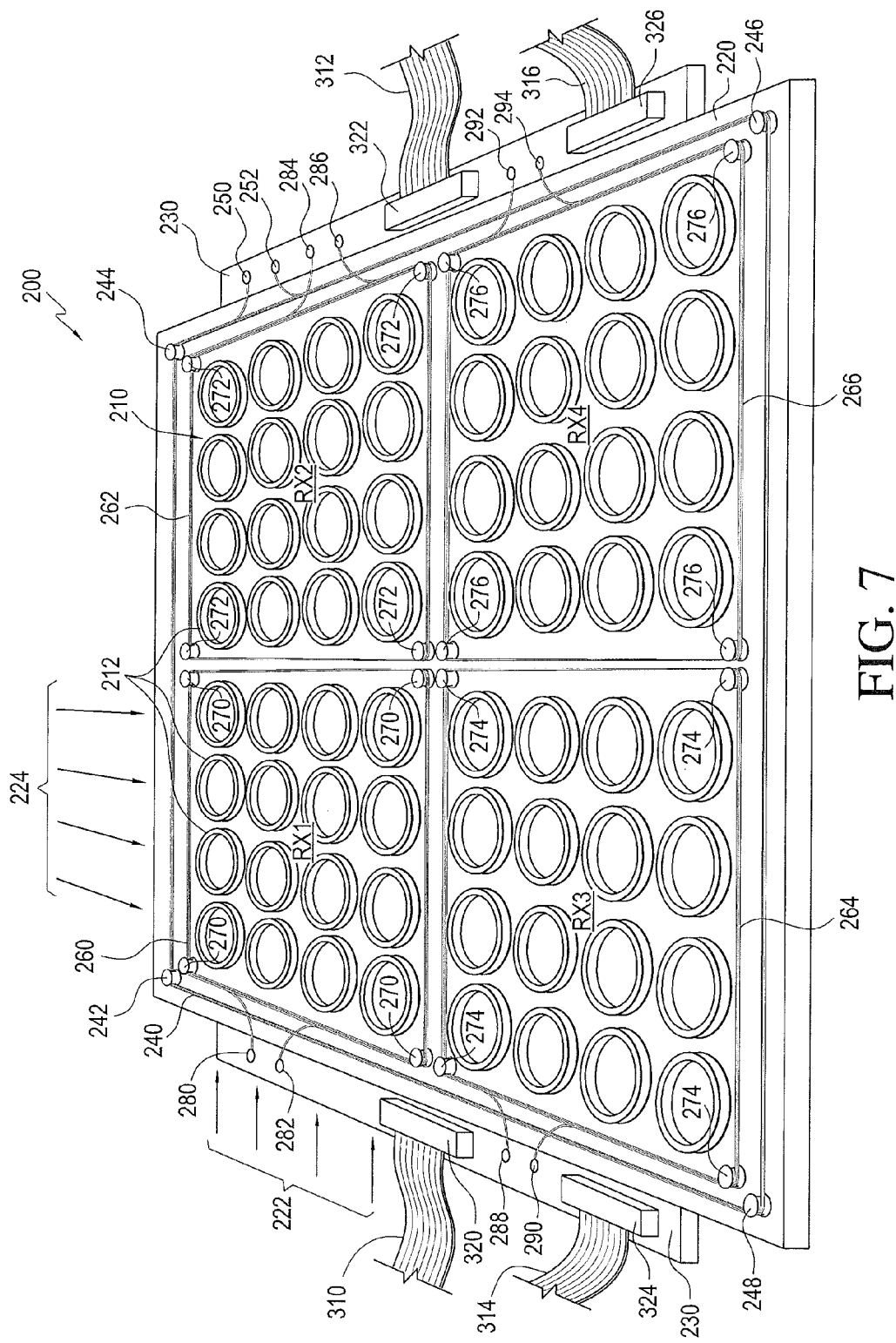
FIG. 7 Illustrates a sensor coil array in accordance with a second, preferred embodiment of the invention and having four quadrant coils surrounding corresponding sectors of the sensor coil array and a peripheral coil surrounding the entire array, in accordance with the present invention.
Figure 8:
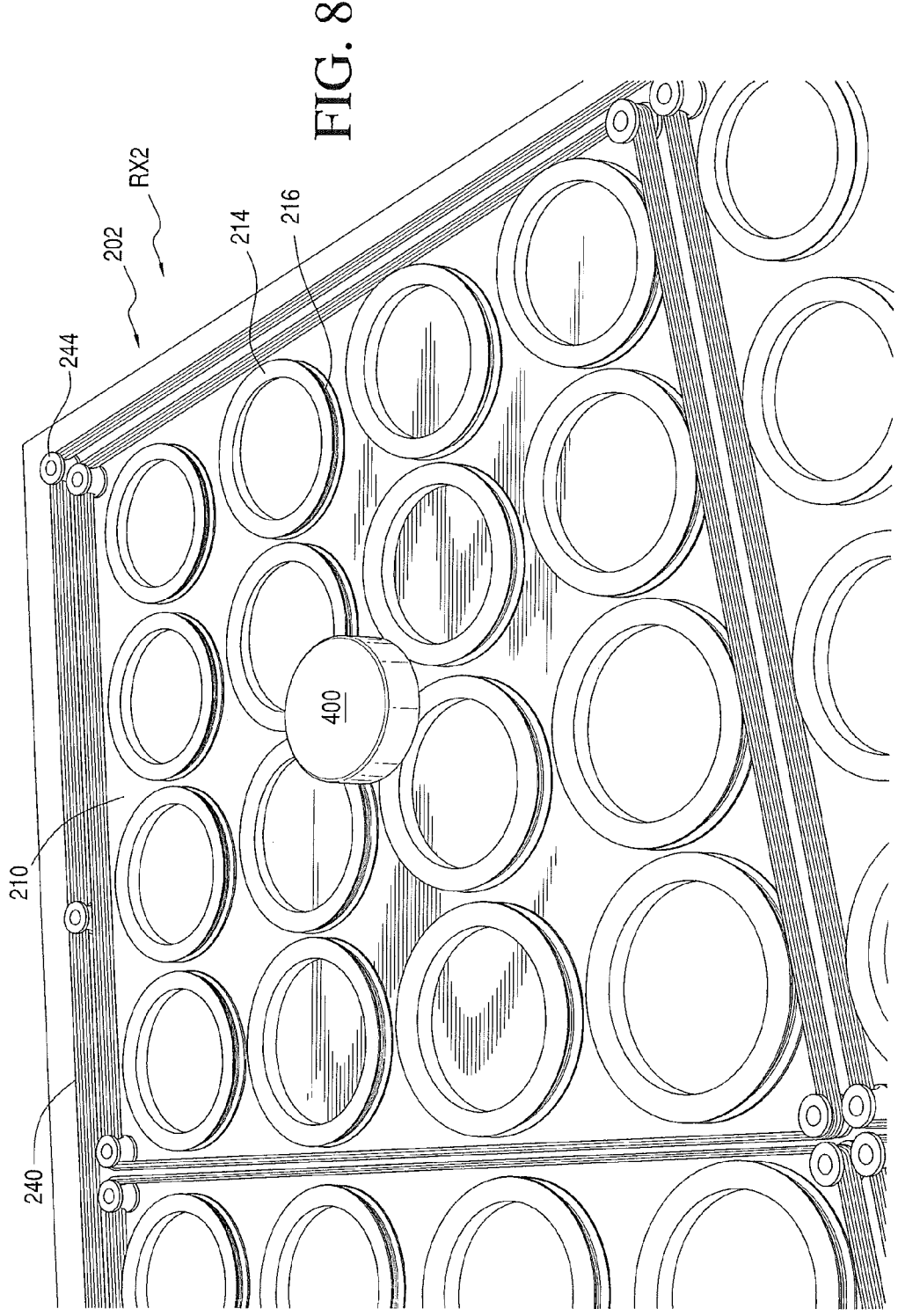
FIG. 8 illustrates a single quadrant sector of the array of FIG. 7, in accordance with the present invention.
Figure 9:
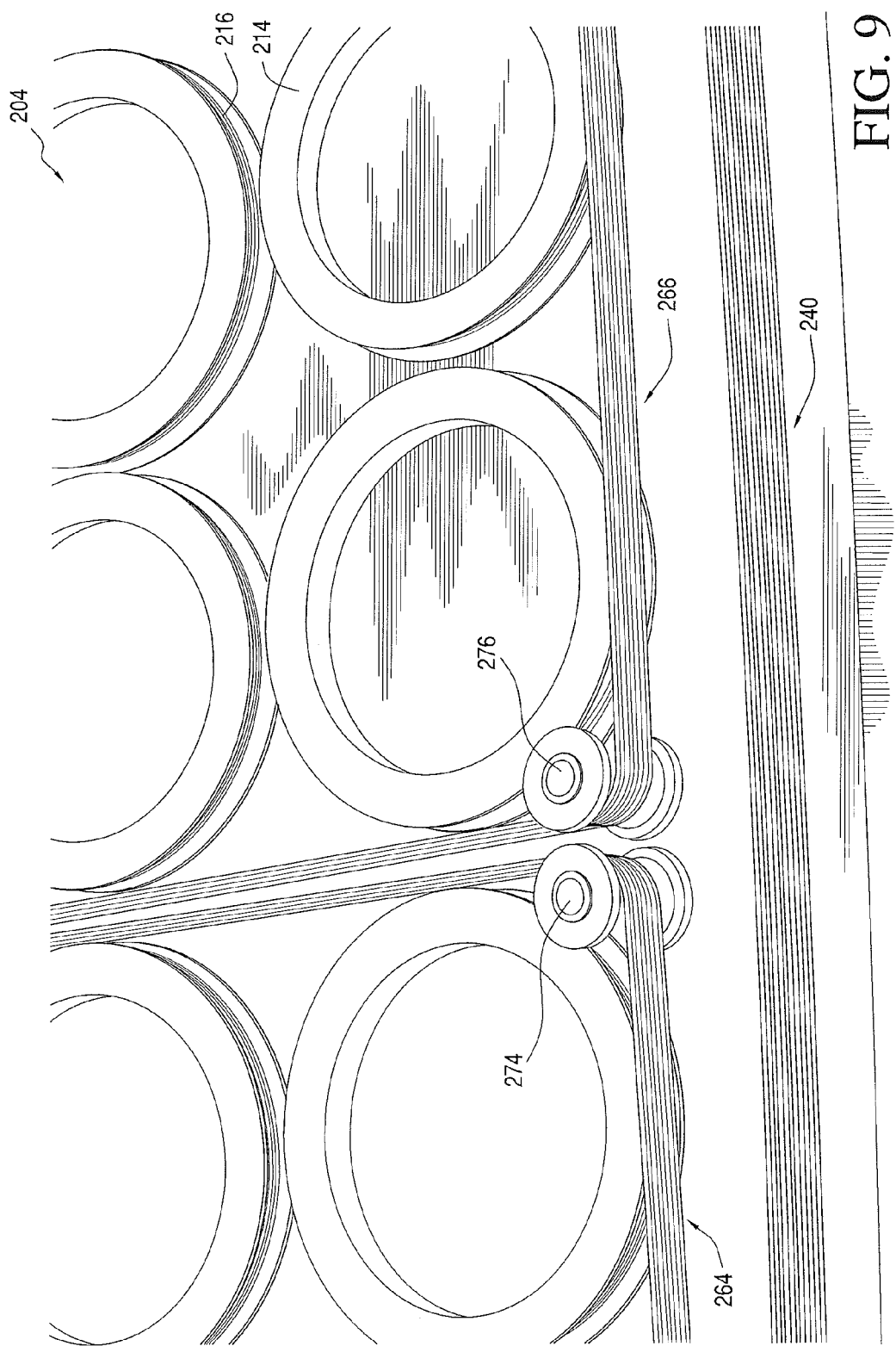
FIG. 9 illustrates a close-up view of selected sensor coils of FIG. 7, in accordance with the present invention.

A detector head constructed in accordance with a second embodiment of the present invention is illustrated at 200 in FIG. 7, with enlarged portions thereof being illustrated at 202 and 204 in FIGS. 8 and 9, respectively. The detector head carries a substantially planar array 210 of pixel or sensor coils 212 which in this embodiment may be polymer or ferrite bobbins 214 carrying turns of thin wire 216, as best seen in FIGS. 8 and 9. The bobbins may each be about an inch in diameter and may carry, for example 40 turns of 28 gauge wire to produce a desired magnetic field. Each pixel or sensor coil 212 has an equivalent inductance of about 300 microHenries (300 μH) and is configured to sense magnetic perturbations from a target object buried in soil or strata when illuminated with a 30 kHz illumination signal. The array 210 may consist of 64 coils 214 mounted on a base plate 220 and aligned in eight rows 222 and eight columns 224, although other configurations may be used, with the turns of wire of each coil leading to a corresponding terminal (not shown) on one or the other of printed circuit boards 230 and 232 mounted on base plate 220.

A perimeter illumination coil 240 is mounted on base 220, as by upstanding corner pegs or fame members 242, 244, 246 and 248 secured to the base, and is substantially coplanar with pixel coil array 210, and surrounds the array 210 with, for example, 8 turns of 18 gauge wire connected to terminals 250 and 252 on circuit board 232. Perimeter illumination coil 240 is configured to be energized by a selected 30 kHz illumination signal having a selected amplitude of approximately 5 volts. Surrounding corresponding sectors of the array 210 are four quadrant coils 260, 262, 264 and 266, also coplanar with the coils in array 210 and mounted on corresponding upstanding pegs or frame members secured to the base 220. Pegs 270 carry coil 260, which surrounds, for example 16 pixel coils which form a part of a first sector, or quadrant, RX1 in the manner described with respect to the first embodiment and illustrated in FIG. 3. Similarly, pegs 272, 274 and 276 carry coils 262, 264 and 266 respectively, which surround the 16 pixel coils 214 which make up each of the sectors, or quadrants, RX2, RX3 and RX4, respectively. The quadrant coils 260, 262, 264 and 266 are connected to terminals 280, 282; 284, 286; 288, 290; and 292, 294, respectively, on the circuit boards 230 and 232.

Figure 10:
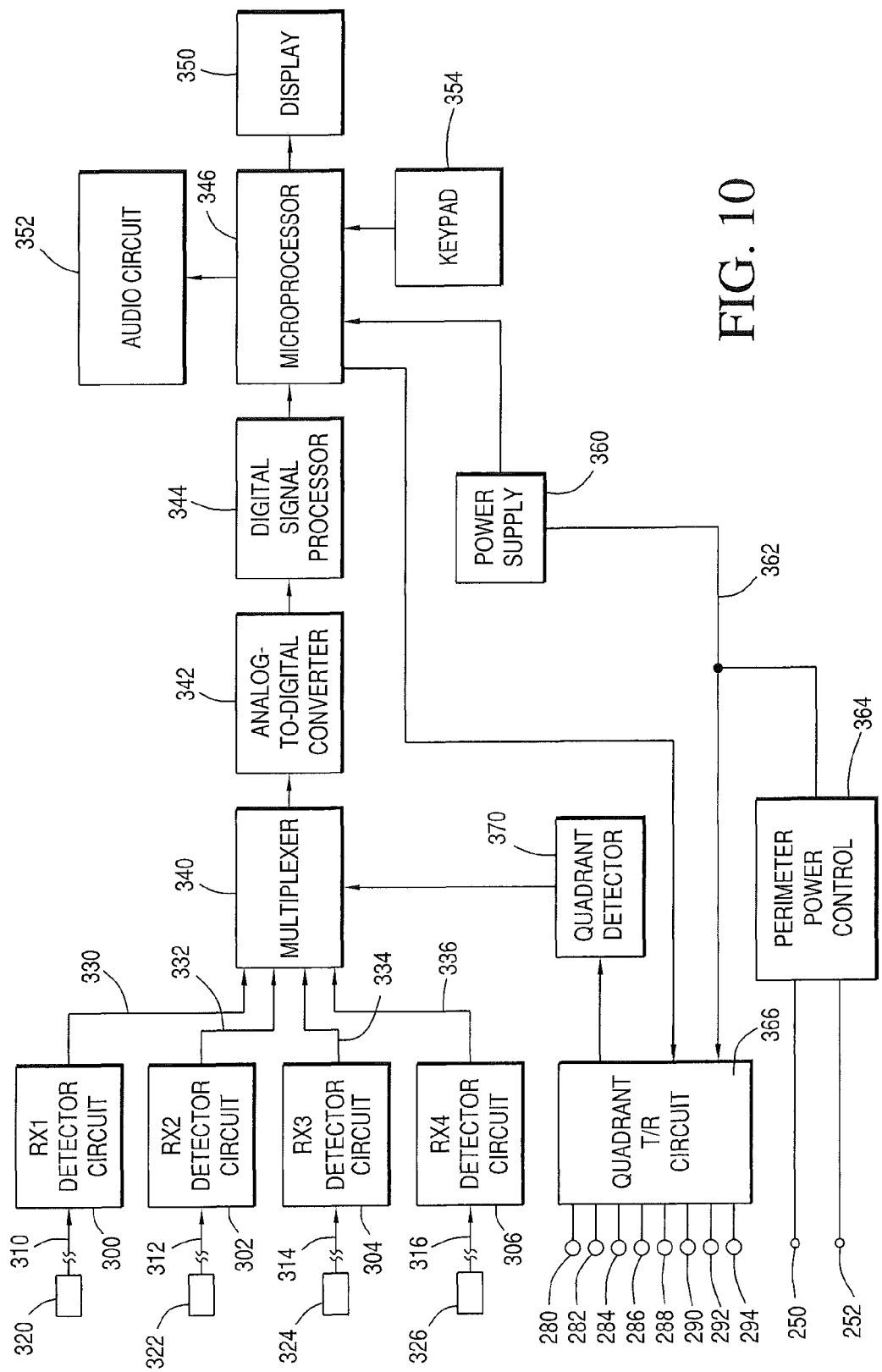
FIG. 10 is a block diagram of electronic circuitry for the second embodiment of the metal detector of FIG. 1

As diagrammatically illustrated in the block diagram of FIG. 10, four detector circuits 300, 302, 304 and 306 are connected through corresponding cables 310, 312, 314 and 316 and respective pin connectors 320, 322, 324 and 326 to the leads of the coils in the corresponding arrays RX1, RX2, RX3 and RX4. The outputs of the detectors are connected via cables 330, 332, 334 and 336 to the control interface of the metal detector device which includes a multiplexer 340, which scans the coil outputs and feeds them through analog-to-digital converter 342 and digital signal processor 344 to the device controller, which incorporates a microprocessor 246. A display unit 350 is controlled by the microprocessor, as is an audio output 352, with a keyboard being provided to provide input instructions to the microprocessor. A power supply 360, which may consist of a battery and a high frequency AC generator, supplies operating power to the microprocessor and other circuitry, and provides AC power through line 362 to controller 364 and terminals 250, 254 to provide an illumination signal for driving the perimeter coil 240 when it is selected to produce an illuminating magnetic field. Power supply 360 also supplies high frequency voltage through quadrant coil controller 366 to selected quadrant coils that are to be energized by way of coil terminals 280-294 when the quadrant coils are to be used to produce illuminating magnetic fields. When the quadrant coils are to be used to sense or detect magnetic fields, controller 366, under the control of microprocessor 346, disconnects the coils from the power supply 360 and connects them to the multiplexer by way of quadrant coil detector, or receiver, circuitry 370.

Figure 11:
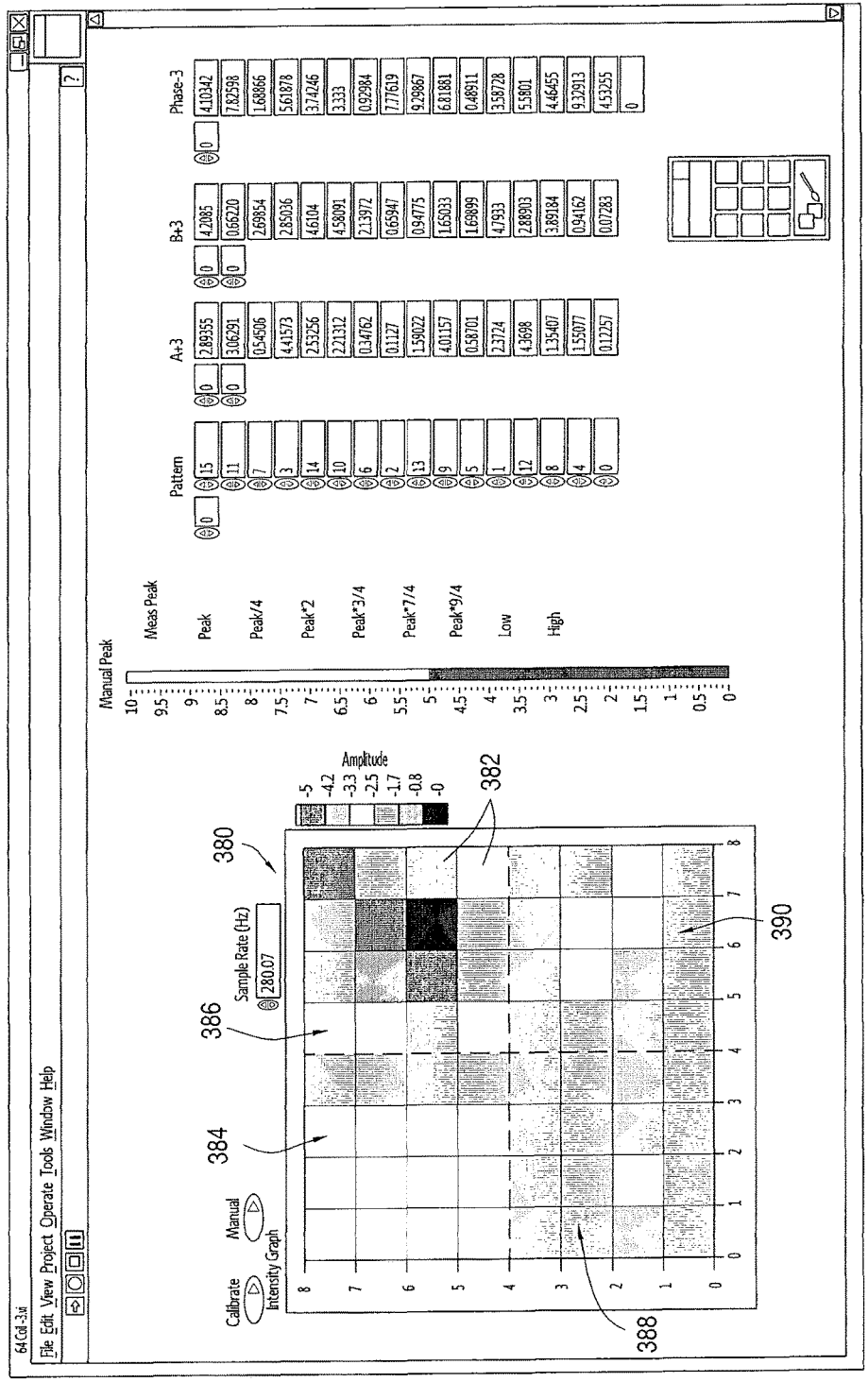
FIG. 11 illustrates a display screen image produced by the coil array of FIG. 7, indicating the presence of a target at a first location, in accordance with the present invention.

In both embodiments of the present invention, the metal detector display 350 is a compact solid state display unit such as a commercially available GPS style touch screen display, and has a plurality of user-adjustable controls. As described above, in the first embodiment of FIG. 2 the display screen shows a dot or similar avatar that moves on the screen as the detector head moves, to display the relative location of a target object with respect to the head. In the second embodiment, the display 350 incorporates a color screen display such as that illustrated in FIGS. 11 and 12 at 380, wherein the screen provides a color image, here shown in shades of grey, having pixel-blocks 382 each representative of the output signal produced by a corresponding small pixel-sensor coil, and four larger sectors 384, 386, 388, and 390, represented by dotted lines in FIG. 11, illustrating the output signals of each of the four quadrant coils. The color of each block and each segment varies with the intensity of the magnetic field detected by the sensor corresponding to that block or sector. The colors of the pixel-blocks and of the sector in the displayed image change as the detector head moves with respect to a target and the outputs of the sensor coils change as their position with respect to the target changes. The block or sector representing the coil closest to the target has the highest intensity color in the array and thus provides an accurate display of the target's relative location under the pick-up or search head.

During use of the detector of the second, preferred form of the invention, the detector array may be operated in three modes; a deep mode, a shallow mode, or a cycling mode wherein the unit continuously cycles between the deep and shallow modes. In the deep mode, the perimeter coil 240 described above is energized by the power supply 360 at a suitable frequency, for example about 30 kHz, by way of control switch 364 to illuminate the ground beneath the detector head with an alternating magnetic field. In this mode, the quadrant coils 260, 262, 264 and 266 are employed as sensors connected by way of the transmit/receive switching circuit 366 to receivers 370 in the interface circuitry, with the resulting output signals being scanned by multiplexer 340 and supplied to the display unit to produce a corresponding color display in each of the four sectors 384, 386, 388 and 390 of the display screen, as illustrated in the example of FIG. 11. The overall color of each of the sectors corresponds to the intensity and phase of the received magnetic field by the corresponding quadrant coil. The presence of a target (or targets) in the soil or strata below the detector head will perturb the illuminating magnetic field, and this perturbance will be sensed and detected in varying degrees by each of the four quadrant coils, and in response corresponding colors are generated in corresponding sectors of the display screen. In this mode, the detector is sensitive to large targets and to targets relatively far below the surface of the ground. As the detector head moves across the soil strata or ground, the color of each sector changes in response to the sensed phase changes in the sensing coils and visually indicates or tracks the relative position of the target with respect to the detector head's perimeter.

Figure 12:
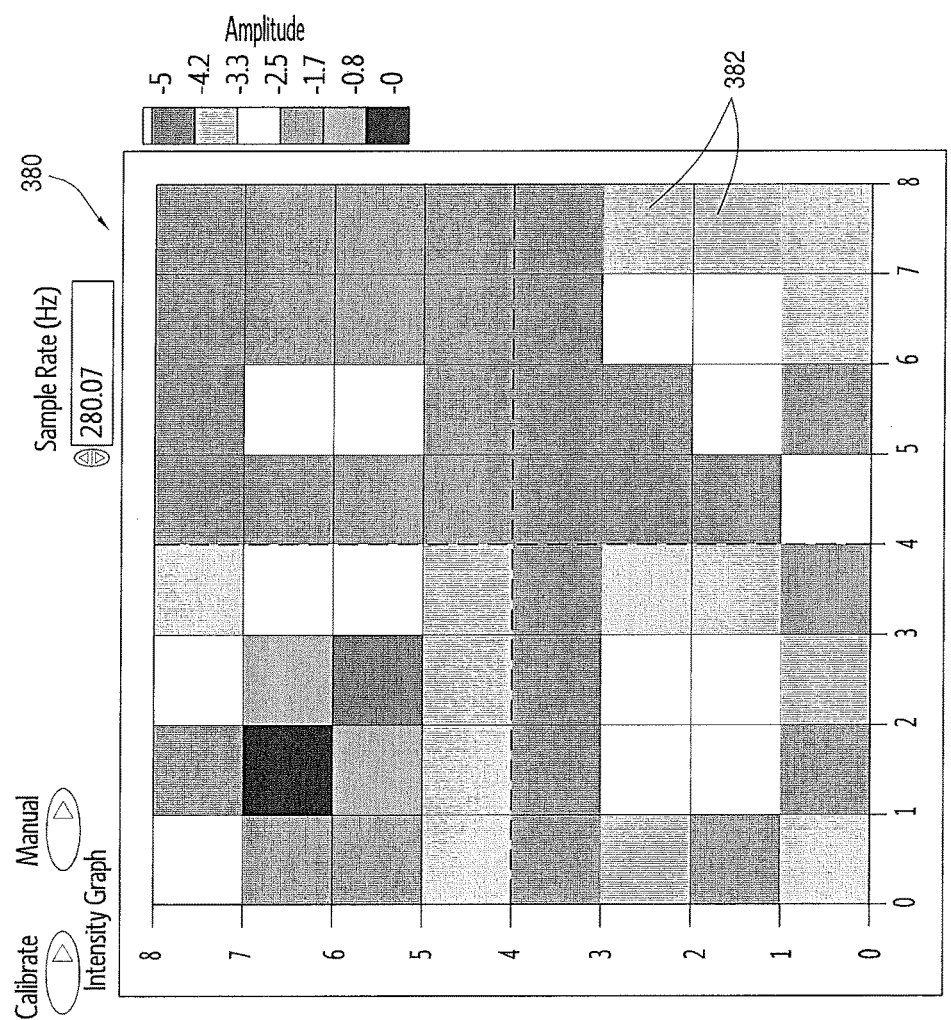
FIG. 12 illustrates a display screen image produced by the coil array of FIG. 7, indicating the presence of a target at a second location, in accordance with the present invention.

In the shallow mode of operation, the perimeter coil 240 is disconnected from the power supply 360 by switch 364, and the quadrant coils are connected to it by transmit/receive switch 366 to be energized by the power supply at, for example, about 30 kHz to serve as illuminator coils. Preferably, the quadrant coils are energized sequentially, one at a time, or are energized in diagonal pairs; for example coils 260 and 266 are energized for a first period, and then coils 262 and 264 are energized. At the same time, the output signals from all of the small pixel sensor coils 214 in each of the quadrants are detected by their corresponding interface receivers 300, 302, 304 and 306, which are scanned by the multiplexer 340, and the outputs are used to generate a target display signal for the display screen 380. The multiple pixel display blocks 382 on the screen each correspond to one of the pixel sensor coils in the array, and in use, each pixel display block has a color corresponding to the intensity, or magnitude, of the corresponding pixel sensor coil's output signal. The pixel display block intensity is thus an indication or measure of the magnitude of magnetic field perturbation detected by the corresponding sensor coil. Accordingly, the screen displays a pattern of colored blocks such as the block 382 to produce a color pattern that indicates the presence and relative movement of a target positioned beneath head 36 showing the target's proximity to each pixel sensor coil. As the detector head is moved across the ground or soil strata surface, the color of each pixel display block changes to track the relative position of the detected target with respect to the detector head, FIGS. 11 and 12 illustrating different patterns corresponding to different locations of a target. As an example of this operation, the pattern of FIG. 11 illustrates the coil outputs in response to a target 400, shown in FIG. 8 as being adjacent the coils of sector RX2 corresponding to sector 386 of the display. FIG. 12 illustrates a pattern with the target adjacent the coils of sector RX1 of FIG. 7, corresponding to sector 384 of the display.

In the cycling mode, the metal detector system 30 is operated to alternate continuously between the deep and shallow modes, with the display screen showing a background color pattern that represents the deep mode in each of its quadrants, or sectors, and showing pixel display block colors superimposed on the background to represent measurements made in the shallow mode. The resulting changing colors give the user a changing pattern representing an effectively three-dimensional view of the ground beneath the detector head as the detector is moved, and this is normally the preferred mode of operation of the device.

In accordance with the method of the present invention, a user first normalizes or calibrates the metal detector system 30 in one of two ways. First, it can be done by holding the distal pickup array sensor vertically so that nothing but air is present around the pickup array in head 36. The excitation or illumination signal is then energized and the receivers sense their corresponding array coils individually so that a calibrated response in air can be generated and displayed. Alternatively, the metal detector can be calibrated by placing the pickup sensor on or near the ground and energizing the illumination signal to normalize the displayed response to any background conductivity in the soil where detecting is to be carried out. The metal detector of the present invention will generate a uniform and two dimensional image on the display screen in response to normalization. This will be featureless when normalization is carried out while the metal detector's pick-up or search head 36 is held up in the air, but will have a background color when normalization is carried out with the detector's pick-up or search head 36 on or near the ground. In either case, the normalized response is used as a baseline for comparing the array coil responses during metal detection activities. The user controls include a "normalize" button or control input for use in this normalization or calibration procedure.

The user will also preferably have access to one or more linear or continuously adjustable controls near touch pad 48 and display 46 for illumination power, illumination signal, intensity and frequency and receiver sensitivity and frequency response. The receive signal can be adjusted for a "squelch" like feature which permits the user to control the sensed response of the metal detector 30.

After adjustment and normalization of the detector 30, the user sweeps or moves the pickup array in head 36 over the soil as the perimeter coil, and the quadrant coils in the second embodiment, are illuminated. The target location information is sensed as phase changes in the induced magnetic field that is received in each of the sensor coils, and these phase changes are observable as changes in the pixel display blocks visible on display screen 46 as the user sweeps the pickup array in head 36 past a concealed target so that, in terms of relative motion, the target image traverses the display screen while the user sweeps the pickup array over ground.

In the absence of target items or objects, the display screen of detector 30 will generate an easily distinguishable 2-D image for a sensed response from uniform and homogenous soil. In the second embodiment described above, the screen 46 will provide a background color representing the conductivity of the soil. As the user sweeps the pickup array over the soil the display will show that the movement is sensed but will not provide any visible indicia tending to indicate that a sensed ferrous or non-ferrous target object or item is within the homogenous soil.

Moving the detector head 36 over a ferrous or non-ferrous target item or object within the soil will generate a different image for the display 46. For the first embodiment, this may be in the form of an illuminated dot or avatar 60, as shown in FIG. 2, which moves as the pickup array is moved over the otherwise homogenous soil. In the preferred form of the second described embodiment, the display 46 will provide a color image representing the intensity of the detected signal for each of the pixel display blocks for corresponding pixel sensing coils. The ferrous or non-ferrous nature of the target will be represented by the color of the pixel display block, and as the user moves the pickup array over the soil concealing the target item, the colors of the blocks and segments will change. By observing the appearance of the display, the user can discover the location of the target item under the soil beneath the moving pickup array in head 36.

Because the present device utilizes an alternating illumination field, with phase detection of perturbations in the field caused by anomalies in the magnetic field, the device 30 operates to identify and locate targets with respect to the detector head 36 even when the head is stationary over a target. With the color display providing both a deep and a shallow mode view of the target, the device 30 provides the user with an enhanced view of the target image and, with the color of the display indicating the intensity of the received signal, it provides an improved indication of the target's location and depth.

Persons of skill in the art will appreciate that the present invention makes available a metal detector 30 for sensing and indicating proximity and location of selected target objects or features within varied strata, comprising: (a) an excitation coil configured to generate and project an excitation signal in a selected direction, where the excitation signal is adapted to energize a first target object or feature within the strata or surface; (b) a pick-up 36 with an array of pixel-receive coils configured to receive electro-magnetic energy from the first energized target object or feature; and (c) wherein the array of pixel-receive coils is arranged in a pre-defined configuration making it likely that relative motion between the array of pixel-receive coils and the first energized target object or feature is detectable as individually sensed changes in received signal levels among the pixel-receive coils in the array. Metal detector 30 further includes a 2-D display 46 arranged to generate a changing display of a moving target avatar 60 illustrating relative motion of the target object or feature in response to the individually sensed changes in received signal levels among the pixel-receive coils in said array. Metal detector 30 thus displays individual sensor coil detection images rendered by corresponding pixel display blocks driven by controller or microprocessor 346 which is programmed to display a selected intensity and color corresponding to the location and proximity of the target with respect to the sensor coils and sector coils in the detector head 36.

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. A metal detector comprising:
    a stem or shaft having a proximal end and a distal end, said shaft distal end carrying a distal detector or search head having a first, peripheral coil mounted on a base;
    a power supply for energizing said peripheral coil to produce a detecting magnetic field;
    multiple sensor coils mounted on said base in an array within and substantially coplanar with said peripheral coil for sensing perturbations in the magnetic field due to a target and producing corresponding output signals;
    receivers detecting said output signals;
    a display unit having a display screen;
    a scanner for transferring said output signals to said display screen to produce images of said target; wherein said scanner generates signals to generate a display of relative location for a target object which is beneath said search head; and
    wherein said sensor coils are arranged in a first, second third and fourth sectors, and further including:
    a first sector coil surrounding and substantially coplanar with a selected plurality of first sector sensor coils, wherein said first sector coil and said first sector sensor coils are located within a selected first quadrant within said peripheral coil,
    wherein said first sector coil is energizable to produce a first quadrant or corresponding first sector magnetic field which is detectable by said first sector sensor coils and wherein said first sector coil is connectable to detect perturbations in magnetic fields produced by said peripheral coil and to produce corresponding first sector output signals.

2. The metal detector of claim 1, further comprising a plurality of first sector receivers connected to detect output signals from said first sector coil and said first sector sensor coils, said scanner being connected to transfer a first sector coil output to said display screen to produce first sector images of said target.

3. The metal detector of claim 1, wherein said display screen displays both first sector images and first sector individual sensor coil images, and wherein the intensity and color of each image corresponds to the location and proximity of said target with respect to the first sector sensor coils and said first sector coil in the detector head.

4. The metal detector of claim 1, further comprising a second sector coil which surrounds and is substantially coplanar with a selected plurality of second sector sensor coils, wherein said second sector coil and said second sector sensor coils are located within a selected second quadrant, proximate said first quadrant and within said peripheral coil,
    wherein said second sector coil is energizable to produce a second quadrant or corresponding second sector magnetic field which is detectable by said second sector sensor coils and wherein said second sector coil is connectable to detect perturbations in magnetic fields produced by said peripheral coil and to produce corresponding second sector output signals.

5. The metal detector of claim 4, further comprising a plurality of second sector receivers connected to detect output signals from said second sector coil and said second sector sensor coils, said scanner being connected to transfer a second sector coil output to said display screen to produce second sector images of said target.

6. The metal detector of claim 5, wherein said display screen displays first sector images, first sector individual sensor coil images, second sector images, and second sector individual sensor coil images, and wherein the intensity and color of each image corresponds to the location and proximity of said target with respect to the first or second sector sensor coils and said first or second sector coils in the detector head.

* * * * *